Oct. 3, 1967  J. JULLIEN-DAVIN  3,344,707

TOPOGRAPHY INDICATOR FOR AIRCRAFT

Filed March 8, 1966  7 Sheets-Sheet 1

INVENTOR
Jean Jullien-Davin
By Sparrow and Sparrow
ATTORNEYS

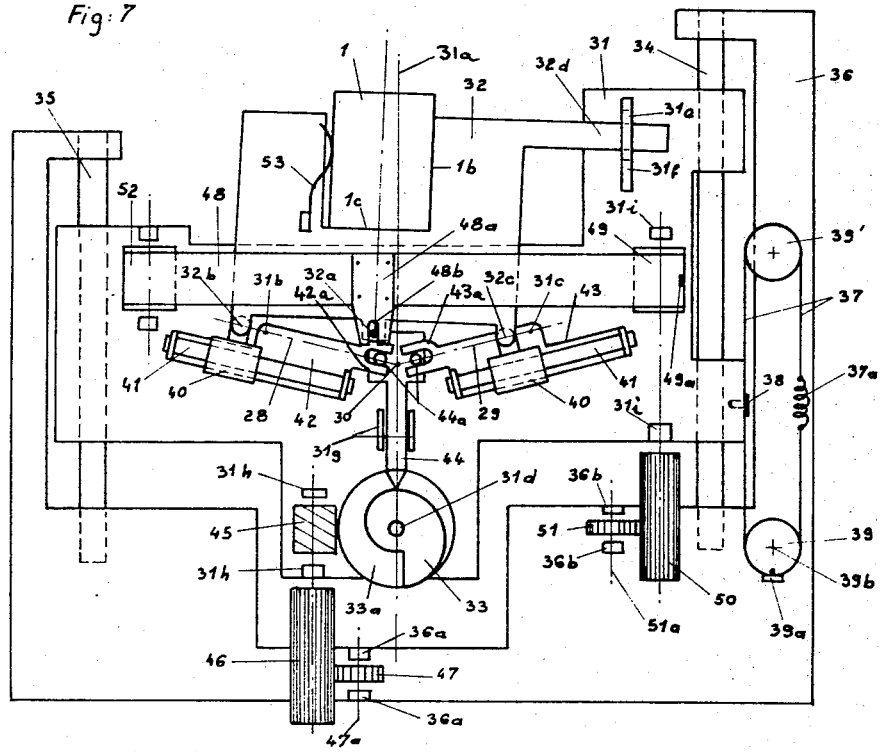
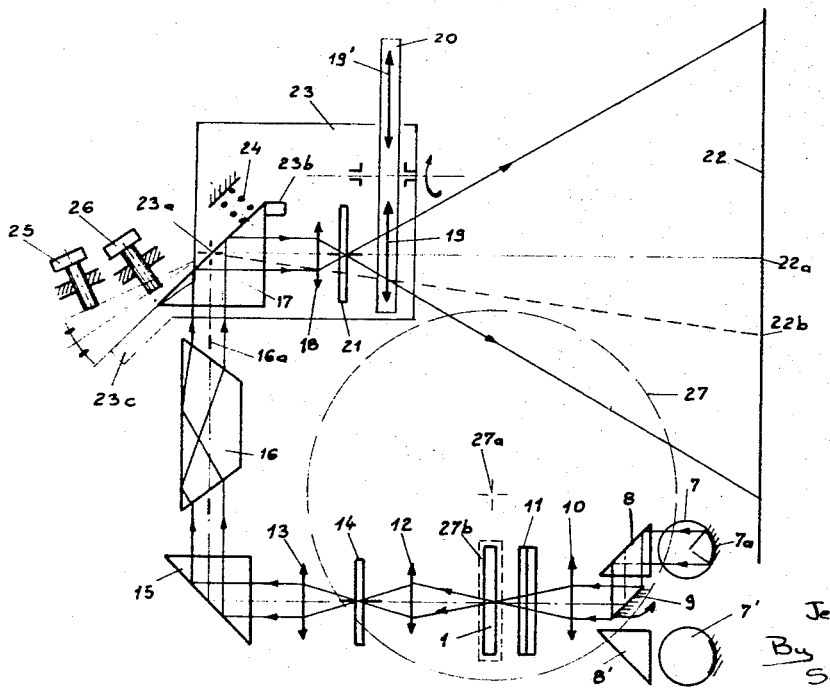

Oct. 3, 1967  J. JULLIEN-DAVIN  3,344,707
TOPOGRAPHY INDICATOR FOR AIRCRAFT
Filed March 8, 1966  7 Sheets-Sheet 5
Fig: 6
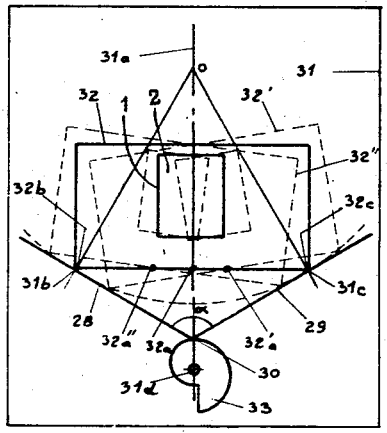
Fig: 8
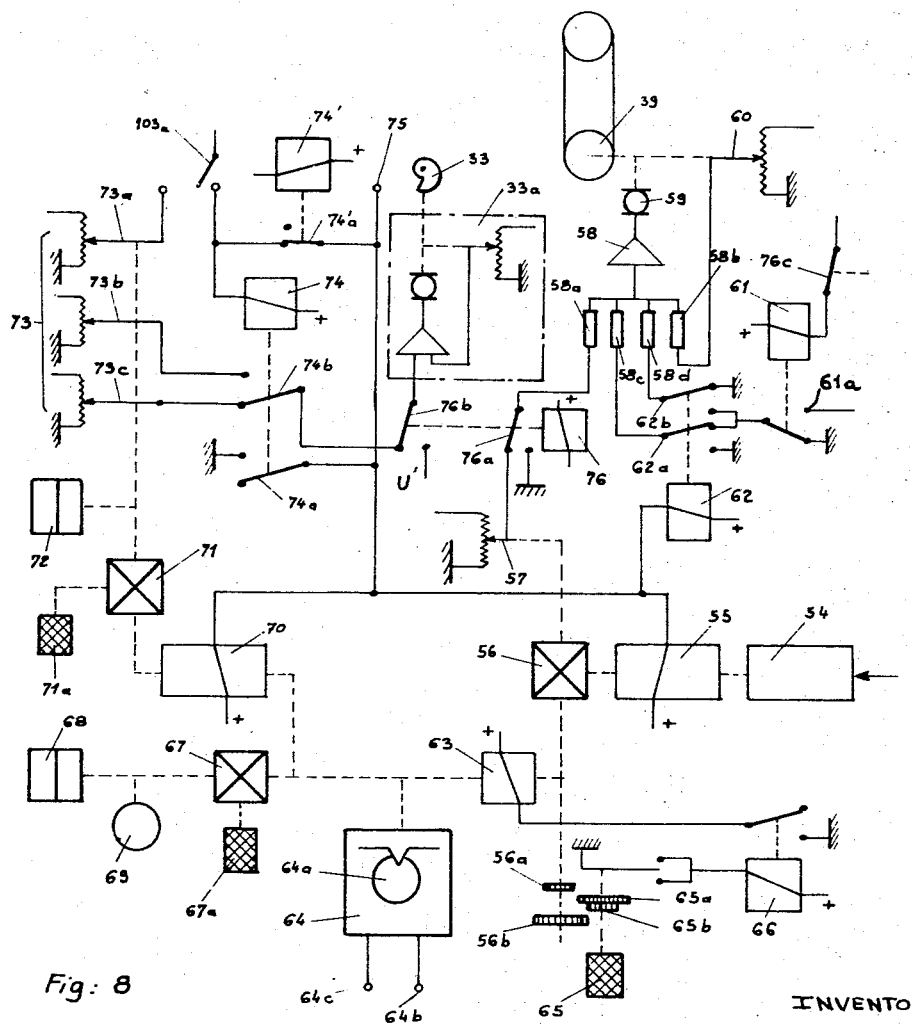
INVENTOR
Jean Jullien-Davin
By Sparrow and Sparrow
ATTORNEYS Oct. 3, 1967 J. JULLIEN-DAVIN 3,344,707
TOPOGRAPHY INDICATOR FOR AIRCRAFT
Filed March 8, 1966 7 Sheets-Sheet 5
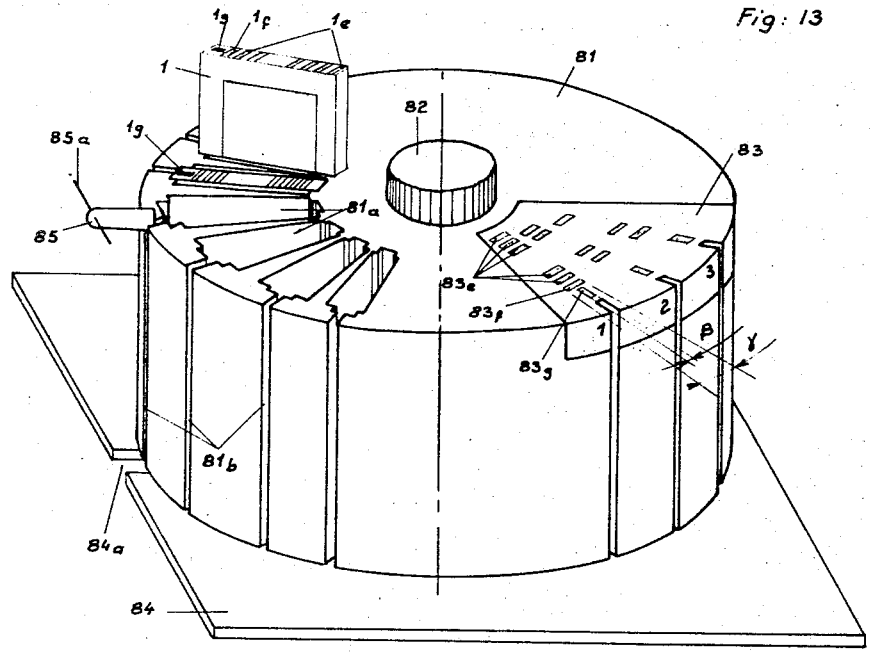
INVENTOR
Jean Jullien-Davin
By
Sparrow and Sparrow
ATTORNEYS Oct. 3, 1967　　　J. JULLIEN-DAVIN　　　3,344,707
TOPOGRAPHY INDICATOR FOR AIRCRAFT
Filed March 8, 1966　　　　　　　　　　　7 Sheets-Sheet 6
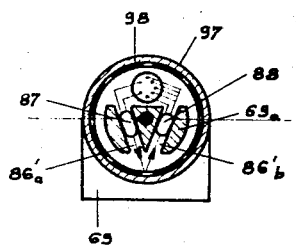
Fig: 18
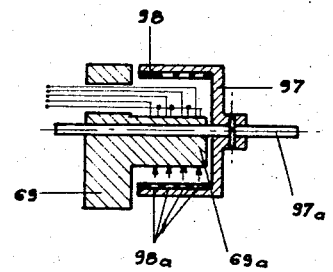
Fig: 17
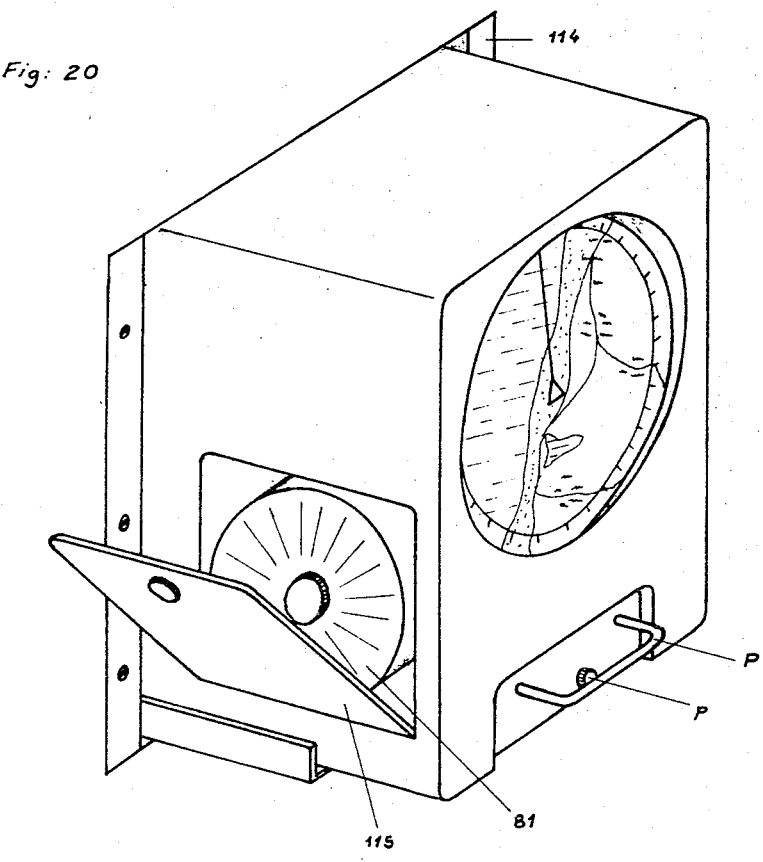
Fig: 20
INVENTOR
Jean Jullien-Davin
By
Sparrow and Sparrow
ATTORNEYS United States Patent Office 3,344,707
Patented Oct. 3, 1967

3,344,707
TOPOGRAPHY INDICATOR FOR AIRCRAFT
Jean Jullien-Davin, Valence, France, assignor to Crouzet,
Valence, Drome, France, a French company
Filed Mar. 8, 1966, Ser. No. 532,707
Claims priority, application France, Dec. 7, 1965,
689, Patent 1,437,509
18 Claims. (Cl. 88—24)

ABSTRACT OF THE DISCLOSURE

An aircraft topography indicator controllable by a navigation computer yielding flight data of the speed direction and drift type for continuous indication of the position of an aircraft by the projection onto a screen of a map of the area over which the aircraft is flying, the aircraft being represented by a symbol projected onto the same screen over which the image of the map passes, the map being movable, the movements controlled by the navigation computer; projection means, an optical system and a projection screen; a magazine to contain detachable individual maps of the area over which the aircraft is to fly; selection means whereby a map corresponding to the area over which the aircraft is next to fly is selected from the individual maps in said magazine, and transfer means controlled by the said selection means for individually bringing each of the individual maps into an object plane of the optical system for projection on to the screen and for return to the magazine.

---

This invention relates to a topography indicator for aircraft, i.e. a navigation instrument of the dead-reckoning type, in which the position of the aircraft on a map of the area over which the aircraft is flying is indicated continuously by projection on a screen in dependence on navigational data (speed, direction, drift, and so on) processed by a computer to which the said apparatus is connected.

In known apparatus of this type the aircraft is represented by a stationary point (generally a stylised symbol) projected onto the screen, while the map, which is projected onto the same screen and represents the area over which the aircraft is flying, is movable in the object plane.

At the present time, some of the known instruments use a map which is photographed, printed or reproduced similarly on a strip or film unwound from a feed reel and rewound on a take-up reel after passing through the object plane of the optical projection system.

A map in strip form can therefore be used only for a well defined route and each new route requires the preparation of a new map.

In other known instruments, individual maps are used which are disposed in a non-driven magazine within hand reach, the magazine simply acting as a case from which the user has to select and withdraw (and replace) the individual maps one by one to position them in the navigation apparatus and this is obviously just a suggestion for navigators.

The object of this invention is to obviate the above disadvantages and the topography indicator according to the invention is characterised in that, inter alia, in order to allow the use of individual maps which together grouped as a grid can cover a flight area of any length and width, the map magazine with which the apparatus is provided is movble and controlled automatically in dependence on the "exit edge" of the individual map arriving at the end of its use (i.e. whichever of its N, S, E or W sides at which the aircraft symbol leaves the individual map in question), so that after the said individual map has been returned to the magazine the next appropriate individual map is presented, i.e. the one which, allowing for the route followed by the aircraft, should logically replace the previous individaul map in the object plane.

Although the magazine could receive a movement of translation, in a preferred embodiment the drum is provided with radial cavities for the individual maps and is rotated so that whichever of the cavities corresponds to the individual map to be used and which has been selected automatically is brought into the position of transfer to the object plane.

According to the invention, the individual maps, each of which is mounted in a frame one end of which has binary code identification elements, are selected by a reader associated with a comparator to which data are delivered by binary counters, a change of map being initiated when the map at present in use comes to the end of travel position.

When considered in greater detail, the new apparatus is adapted to provide the user with the following results:

Apart from the possibility that the user can make any adjustment required, a compass rose and a symbol denoting the aircraft enable the course angle to be read continuously.

The apparatus can be designed to use any type of true map, more particularly direct Mercator's projection or Lambert's projection maps.

These maps are advantageously in the form of colour transparency or diapositive photographs on a rigid transparent plate. Each map or photograph is mounted in a rectangular frame having means for securing and means for adjusting the position of the photographic plate. Two sides of the frame are set at a right-angle and form reference bases for location of the photograph used within the projection apparatus. Each photograph is referenced by a number recorded on one of the sides of the frame not included in the right-angle.

Further information on this point will be given hereinafter.

The optical projection system, in an object plane of which is disposed the map in use, comprises a plurality of centered systems. A reticle denoting a compass rose is disposed in a main object plane. The beam of light emitted as a parallel ray passes through a known system, for example a Wollaston prism, whereby the image can be rotated about the optical axis of the system. The parallel beam is received by the projection lens which in a main object plane includes a reticle having in centered relationship on the optical axis a stylised symbol of the aircraft, whose longitudinal axis is in the form of a vector, the origin of which is on the optical axis. This reticle can rotate about the optical axis. The projection lens comprises a turret giving two or more magnifications. The optical system naturally has at the entry a light source with all its conventional elements such as condensers, heatproof filters, and so on.

In one advantageous embodiment, the lighting device comprises two lamps, one as an alternative for the other. The user has means available, for example a rotary mirror controlled by a knob, to select either lamp. To reduce size, the entire optical system can be bent twice through a right-angle by means of two total-reflection prisms.

It is advantageous for the point at which the optical axis pierces the screen to be capable of being shifted downwards in order to increase the visible portion of the map ahead of the aircraft position.

To this end, the aforementioned second prism pivots about an axis and the mechanical system bearing the projection lens also pivots about the same axis through twice the angle. Where a continuous shift is required, these rotations can be produced by a gear in the required ratio or alternatively, if the optical axis simply has to be given two positions, the mirror can be resiliently connected to the mechanical system, two adjustable stops separately limiting the two rotations.

In the main object plane the map in use is fixed on a carriage sliding in parallel relationship to the east-west direction of the map. The movement of this carriage is controlled in the appropriate ratio by a control system in dependence on the east-west movement of the aircraft, as caculated by the navigation system, which may be a known computer and which does not form part of the invention. If necessary it is possible to add the component $X=P \sin \theta$ of an aircraft-radio beacon vector from an external computer for adjustment of the indicated position by radio.

The kinematic chain connecting the control system to the carriage comprises a differential input whereby the operator can carry out the initial framing or readjustment during operation by means of a control knob. The east-west carriage is in turn borne by a second carriage sliding in parallel relationship to the north-south direction and controlled by the north-south movements of the aircraft as calculated by the navigation system. If required it is possible to add the component $Y=P \cos \theta$ of an aircraft-radio beacon vector from an external computer for radio adjustment of the indicated position.

A differential input enables the operator to carry out the initial framing or adjustment during operation by a control knob.

The east-west and north-south control kinematic chains have gearboxes whereby two or more different ratios can be obtained so that maps of different scales can be used.

In this way a portion of the map, the compass rose and the aircraft symbol are together projected on to the screen.

By initial framing the operator brings the point of the map representing the real position of the aircraft into coincidence with the aircraft symbol and the centre of the compass rose. The relative position of the aircraft symbol and of the map are then maintained automatically.

There are two possible types of use:

In the first, which will hereinafter be referred to as the "North Method," the projection of the map and of the rose have a fixed orientation; north is at the top of the screen. The aircraft symbol reticle is controlled by a synchro connection and is oriented by an angle equal to the course angle calculated by the navigation system. The vector of the aircraft symbol indicates the course on the compass rose and on the map.

In the second method, hereinafter referred to as the "Course Method," the aircraft symbol is fixed, its vector coinciding with the vertical axis of the screen. The Wollaston prism controlled by a synchro connection is turned in the appropriate direction through half the course angle calculated by the navigation system and inclines the projection of the rose and of the map. The course can be read on the rose and is visible on the map.

It is in this second type of use that it is advantageous to shift the aircraft symbol and the point representing the position towards the bottom of the screen. This shift can be controlled by a special knob.

A two-position knob is at the operator's disposal to select either type of use.

In an advantageous variant, when this knob is in the "course" position it automatically controls the downward shift of the optical axis so that a special knob could be eliminated.

A counter provided with a knob enables the latitude to be displayed manually. This display introduces the appropriate ratio variations into the control chains to allow for the scale variation of the maps in dependence on the latitude. The latitude displayed on the counter is maintained automatically from the latitude control. A knob enables focussing to be adjusted to give clear projection on the screen.

The above-described topography indicator is suitable if the map used is of the type made in a projection system such that the meridians and the parallels form rectangular networks of straight lines. This applies inter alia to direct Mercator projections.

In the case of maps, for example, of the kind prepared by Lambert's projection system, the meridians are concurrent straight lines and the parallels are circles whose centered is at the point of concurrence of the meridians.

Strictly speaking the map should not be slid from east to west on an axis, but should be turned about the centered of the parallels. This center is several metres away (7 to 25 metres for a map on a scale of 1:500,000). Since the east-west movement of the map in the apparatus is very small (of the order of 15 millimeters) as compared with the radius, one may be tempted to mistake the parallel arc with a straight line segment. A calculation shows that the erors introduced, which increase with the latitude, very quickly reach a value of more than 1% at about 35° latitude and more than 2.3% at about 70° latitude.

To obviate this disadvantage it will be assumed that the carriage guide is an arc of a circle of a radius equal to that of the parallel corresponding to the latitude at which the aircraft is situated and that the carriage bears on this guide by two points which, in the middle position, are equidistant from the vertical radius of this circle coincident with the axis of the apparatus. When the carriage is moved laterally, it is really turned about the center of the circular arc. The radius of this circular arc still has to be varied with the latitude. To this end, the tangents at the two points of contact are embodied. These tangents form an angle of about 180° having the axis of the apparatus as bisector. If, instead of sliding the carriage a small quantity on either side of the middle position along the circular arc, it is slid along the tangents, the movements of the carriage will be very similar to those previously. The tangents to a circle of smaller radius would together form a less open angle and the tangents to a circle of a larger radius a more open angle.

The approximate solution enabling anamorphosis to be obtained which converts the rectilinear movement into a curved movement, therefore comprises forming the fixed guide for the east-west carriage from two arms articulated at a point situated on the axis of the apparatus. These two arms together form a very open angle, which varies with the latitude, having the axis of the apparatus as bisector. The carriage rests on these arms by two points which in the middle position are equidistant from the bisector.

This approximate solution gives acceptable errors in every case. The inclination of the arms is calculated once and for all in dependence upon the latitude and is introduced automatically in the manner to be described hereinafter.

Where Mercator maps are used, the two arms are exactly at 180° in relation to one another and are an ordinary link as in the previous case. To maintain good approximation, the maps used have a smaller dimension in the east-west direction than in the north-south direction. To facilitate the location of the successive maps or photographs, the reference numbers are prepared to a code such that if the number of the photograph at present in use is known the number of the next photograph can be deduced in dependence upon the direction in which the limits of the present photograph are left. For example, the map representing the entire world can be divided up into large identical rectangular zones forming a grid system. In each of these zones, which are hereinafter referred to as grids, is disposed a grid which divides the zone into $m$ columns and $n$ lines. The grid therefore consists of $m \cdot n$ rectangles each bounding the portion of a map reproduced on a photograph or individual map.

The $m$ columns are numbered from zero to $m-1$ in increasing sequence from left to right, i.e. from west to east.

The $n$ lines are numbered from zero to $n-1$ from top to bottom, i.e. from north to south. Each photograph is referenced by a number made up of two sections. The first section is the column number and the second is the line number of the portion of map reproduced. For example, if the reference of the map in use is 09.12 and if the limits of the photograph are left on the eastern side, it will immediately be apparent that the next photograph required is reference 10.12; if we leave by the northern limits then the next photograph required has reference 09.11, and so on.

If navigation is taking place in the direction of one of the cardinal points, running along the limit of the photograph, there is the risk that the photograph will have to be continually changed. To obviate this disadvantage, the four sides of the photograph have an additional marginal strip so that the photograph covers a slightly larger rectangle than that defined by the grid. Thus when the limit of a photograph is reached the user is already inside the zone covered by the next photograph. The pilot is warned that he is about to leave the limits of a photograph because a dark zone which is the image of one side of the frame bearing the photograph bears on one side of the projection screen. This arrangement is very useful if the departure from the limits of a photograph takes place substantially at a corner of the photograph. If, for example, the course extends substantially to N-E, the pilot sees the eastern edge and the northern edge of the frame appear at the edge of the screen. If the photograph at present in use has the reference 09.12, then instead of the next photograph being the one having the reference 10.12 which will shortly have to be replaced by photograph reference 10.11, it is the latter photograph that will be used. To facilitate the change of photograph, the carriages are brought into a position which makes the operation possible, for example, at the south end of the travel and at the west end of the travel.

When the photographs are maps of the Lambert type requiring the use of the said anamorphosis system, the latitude is not maintained continuously. The latitude introduced remains constant during the entire period of use of a photograph, i.e., the two inclinable arms retain a constant inclination.

When the limits of the photograph are left by the north or by the south, the latitude introduced varies in the appropriate direction by an amount equal to one step of the grid and the angle of the arms varies in consequence. The change of photograph must be followed by refraining by an amplitude equal to one step of the grid in the appropriate direction. Since this amplitude is fixed it is advantageous, for example, for it to be defined automatically by the rotation through a complete revolution of a spindle provided with a system for locking in a single position and controlling a differential input to the corresponding kinematic chain.

Initially, the pilot does not know the reference of the initial photograph. He then uses a special photograph which shows the entire grid and on which are shown the meridians, parallels and references of the photographs. Knowing his approximate position, he can read the reference of the first photograph required. This special photograph can also be a rough and substantially undetailed map.

It may be that the journey is not fully contained in a single grid but covers an area of part of two or more adjacent grids. In such a case the pilot has two or more photographs bearing the same reference. Since these photographs correspond to very distant areas, there is no risk of confusion. In the event of an error the pilot will immediately notice it and will choose the other photograph bearing the same reference. This case can occur only if the journey is in excess of the length of the dimensions of the grid.

For automatic photograph changing the photographs are placed in any order in the movable magazine, preferably a rotary drum, so that it can be driven in a single direction. The drum is provided with means for fitting it rapidly to its drive shaft. The photographs are disposed radially in cavities in the drum so that their reference number is on the top surface of the magazine or along a generatrix. The photograph reference is given in binary form. For example, the grid will comprise 32 columns numbered 0 to 31 and 16 lines numbered from 0 to 15, i.e. $16 \times 32 = 512$ photographs referred to by their number or address consisting of two numbers of two digits each. The column number can be expressed as a binary with five digits. The line number can be expressed as a binary with four digits. The complete address therefore requires nine digits. Nine well-defined points on the top or side edge of each photograph frame have different appearances and/or shapes depending upon whether the corresponding digit is equivalent to one or zero.

For example, if the digit is equal to one, the corresponding point bears a projection; if the digit is equivalent to zero, there is no projection. In the loaded magazine these nine points are situated on nine concentric tracks. The nine tracks are sensed by nine fixed aligned contacts disposed radially or longitudinally and which change state on passage of a projection. The state of the nine contacts, which form an automatic reader, therefore reproduces the binary number or its complement, representing the reference of each photograph. As has been seen hereinbefore, the reference of the photograph required is recorded in binary form in the apparatus; this is done by means of a memory consisting of two encoders, one of which, with five digits, records the column number and the other, with four digits, records the line number. These two encoders are connected to two counters which display the reference as a decimal on the front surface. On starting, the pilot displays the reference of the first photograph required by means of two knobs. An electronic or relay comparator, or even appropriate wiring making direct use of the contacts of the automatic reader and of the encoders, causes the photograph drum to stop when the reference read off by the automatic reader and the reference displayed by the encoders agree. A safety device controlled by a cam integral dith the magazine renders automatic reading and comparison inoperative if the photograph selected is not in the exact position required; the purpose of this is to prevent the comparator from stopping the magazine as a result of lack of synchronism in the reading of the various digits if a reference, still incomplete, is exactly equal to the reference required.

To prevent the well known disadvantages of contacts, the latter both in the automatic reader and in the memory encoders can be replaced by any equivalent device. For example, each contact may be replaced by a photo-diode associated with a miniature lamp. Depending upon whether the surface presented to such a system is or is not reflecting, the diode will or will not conduct. In that case the frame of each photograph, instead of having a projection to represent the digits of value "1" will have a small reflecting surface.

Instead of being controlled by a cam, the said safety device can be controlled by a supplementary digit. The projection (or reflecting surface) is of a form such that it closes its contact in a smaller angular range than that in which all the contacts of the reader are closed. This ensures complete reading when the safety contact closes and the angular position in which the magazine stops is exact.

The general arrangement is such that when the magazine stops the selected photograph is situated in the same plane as the photograph carriage at the end of its travel. A transfer element automatically slides the photograph from the magazine into the carriage. The transfer element at the same time locks the magazine, and such locking can be used for exact mechanical adjustment. The loaded carriage assumes its normal position with respect to the optical system. In the case of the initial map or photograph manual framing is required.

During use, four "end of travel" contacts associated with logic circuits result in the following automatic operations when the limits of the photograph are reached:

One of the memory encoders is shifted by one unit in the appropriate direction to display the reference of the next photograph. Pre-contacts associated with the end of travel contacts have shifted the two memory encoders by one unit in the appropriate direction to display the reference of the next photograph if the previous photograph is left diagonally. The photograph carriage is moved to the end of its travel. The transfer element reintroduces the used photograph into the magazine. The mechanical locking is released and the magazine is rotated. The next photograph is selected by the above-indicated process. The next photograph is introduced into the carriage which resumes its normal position in the apparatus. Automatic framing takes place by an amplitude equal to one step of the grid in the appropriate direction depending upon the direction in which the encoder or encoders have moved to indicate the reference or references of the next photograph, and this is done on one or both of the guides. The cycle is ready to restart.

The magazine need not be filled. It can have empty compartments in any order. It is possible (for example if the aircraft has had to depart from the original route) for the magazine not to contain the next photograph, in which it will turn indefinitely. In actual fact, when the magazine has carried out two complete revolutions it is stopped and a red light is illuminated. This effect is obtained by a deley relay energised when a magazine drive motor is switched on. At the end of the delay the relay stops the motor, the supply to which passes through its non-operating contact, and illuminates the said lamp. Navigation continues blind, the screen is empty. When the pilot leaves the limits of the zone corresponding to the absent map, he displays the number of the next map and actuates the "cycle" knob and the process is repeated automatically.

To facilitate this blind navigation a special map may be provided, i.e. a "master" map such that the user can have a rough idea of his position on the map.

The master map used may advantageously be the grid map and since the pilot will be familiar with the grid lines and its appearance he will be able to assess his position in the map.

This special map bears an address coded like the others. When the red light illuminates a relay replaces the memory encoders by a fixed device in which the address of the master map is permanently recorded. When the master map has been selected the magazine stops, the light is extinguished and the encoders are normally reconnected. If the encoder consists of diodes associated with lamps, as indicated hereinbefore, it is very simple to obtain this.

The red light is controlled by the operating contact of the delay relay, the non-operating contact of which supplies the lamps of the memory encoders. When the light illuminates, the lamps are extinguished; the state of the encoders then represents the address 00.00. This reference will be used for the "master" map which will thus be defined by the single safety contact. When the master has been selected the magazine is stopped, the delay relay is no longer energised, the light extinguishes, the encoder lamps are re-illuminated. The light is not essential and can be dispensed with.

Finally, the magazine contains a number of positions reserved for special photographs. The reference for these photographs is not encoded as a binary code on their frame. One sector of the top surface (or a portion of the side surface) of the magazine bears a fixed code, the cavities of this sector are marked and contain the special photographs in a specific sequence, the references of the cavities correspond to press-buttons numbered in the same way on the front panel of the indicator. The advantage of the fixed code sector is that the special maps used may be existing maps having a coded reference without it being necessary to do away with that reference, which is simply concealed from the automatic reader by the fixed code sector. The sector is detachable so that the magazine can be completely filled with coded photographs if required.

The first eight numbers of the grid may, for example, be reserved for special photographs, i.e. from 00.00 to 00.07 or, preferably, the numbers corresponding to a small square zone at the corner of the grid, for example the nine numbers 00.00, 00.01, 00.02, 01.00, 01.01, 01.02, 02.00, 02.01, 02.02, so that the automatic change of photograph can be used to navigate over a zone covered by a plurality of special maps. For this purpose the reference of the cavity containing the initial special map must be displayed.

The special photographs may also include a map giving instructions in the event of emergency and the grid map mentioned hereinbefore for location of the reference of the other photographs and acting as a "master" map.

The other special photographs are selected at the user's will depending upon the mission. They are, for example, maps showing the area to a larger scale than the map used for transit and more detailed than such maps. The limits of these maps do not necessarily correspond to the limits of the grid, etc.

If, on take-off, the pilot does not know the reference of the initial map, he actuates the knob marked "grid" and this will cause the special grid map to be displayed. He moves it by means of the framing knobs until he has found the map containing the take-off point.

He then displays the reference of the initial map and then actuates the cycle knob to discard the grid map which is returned to the magazine and display the initial map. The magazine may contain maps in various scales. Of course, the two kinematic chains must have gearboxes with ratios corresponding to the scale. Rather than make the ratio choice manually, it is preferable to add to the reference for each photograph a scale indication represented by supplementary digits. Automatic reading of the reference will enable the ratios to be adjusted automatically. If only two different scales are provided a single supplementary digit is sufficient. Of course, after each change of scale, manual reframing will be necessary.

The pilot also has available a number of optical scales; by using the lens turret he can choose from a number of magnifications. The change of optical scale does not require re-adjustment. If, as stated above, the journey is not contained in a single grid, the magazine may contain two photographs bearing the same reference. If one of these photographs has been incorrectly selected, it is only necessary to actuate the "cycle" knob to return it to the magazine. This operation does not change the reference recorded in the memory encoder; the next photograph will be the correct one.

Precaution is required in stopping the apparatus; since the change of photograph is automatic and the magazine is removable and changeable the apparatus must not be stopped until the last photograph has been returned to the magazine.

A photograph remaining in the apparatus would not have its position in a new magazine or in the same magazine replaced in a different position and not having an empty cavity at the required place to receive the photograph. Malfunctioning would result. Similarly, removal of the magazine while the last photograph is partly engaged therein and partly in the apparatus will cause damage. To obviate this, a safety feature is provided which consists, for example, of an "AND" gate so that the manual control to stop the apparatus causes the photograph at present in use to be returned to the magazine and stoppage is not operative until that has been done.

A relay may also provide this safety feature. The supply to the relay is broken manually but the relay has a self-energising circuit which does not stop until its circuit has been broken by a contact which opens when the photograph has been completely reintroduced into the magazine.

These characteristics and features of the invention, together with others, will be clearer from the following detailed description with reference to the accompanying drawing of one exemplified embodiment which is given without any limiting force.

FIG. 5 diagrammatically illustrates the complete optical system.

FIG. 6 is a diagram to explain the principle of anamorphosis.

FIG. 7 diagrammatically illustrates the construction of the photograph holder carriages.

FIG. 8 is a diagram of the line of drive for moving the carriage in the north-south direction.

Figure 9:
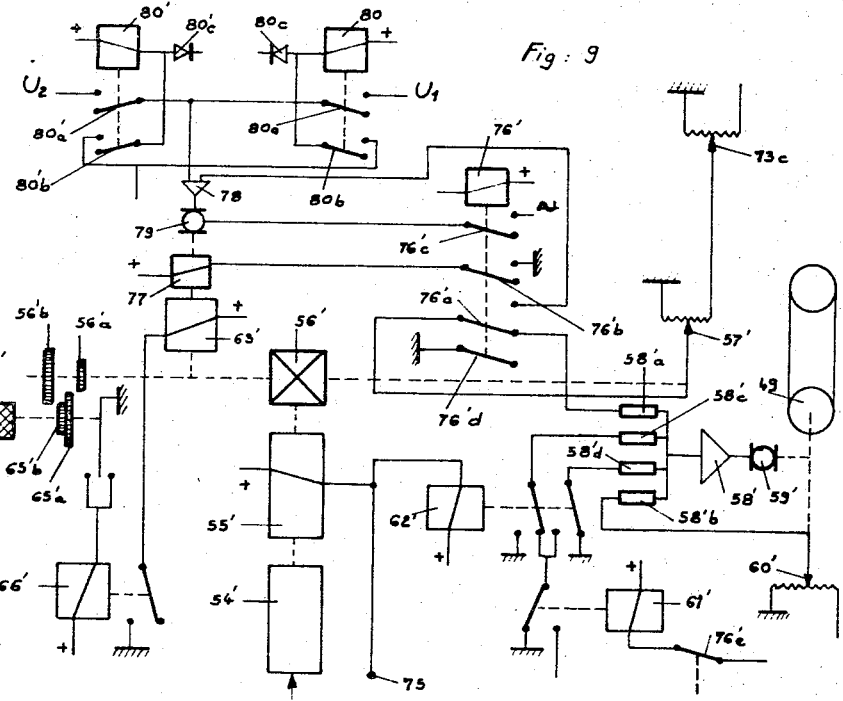

FIG. 9 is the line of drive for moving the carriage in the east-west direction.

Figure 10:
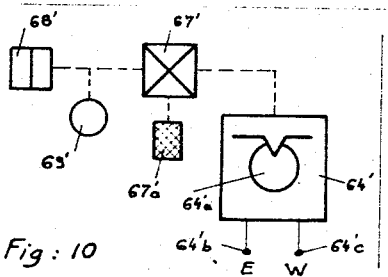

FIG. 10 shows the mechanism for displaying the column number in the photograph reference.

Figure 11:
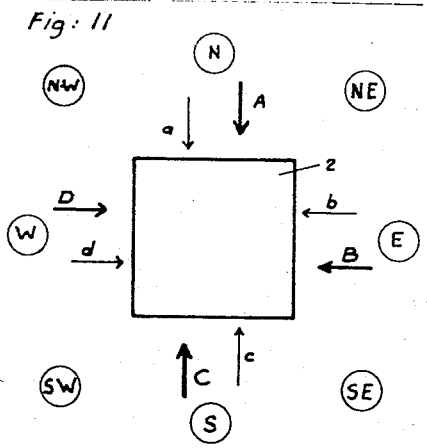

FIG. 11 shows the logic equations used for automatic display of the photograph reference.

Figure 12:
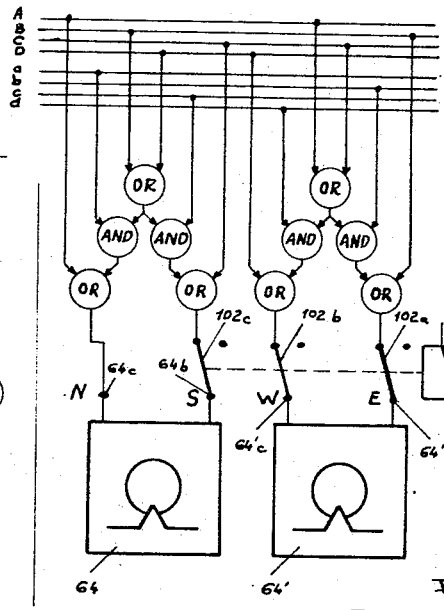

FIG. 12 is a diagram for the solution of these equations.

FIG. 13 shows the magazine.

FIG. 14 shows the principle of the automatic reader.

FIG. 15 shows the principle of a relay comparator.

FIG. 16 illustrates the photograph changing process.

FIGS. 17 and 18 illustrate one embodiment of the memory encoders.

Figure 19:
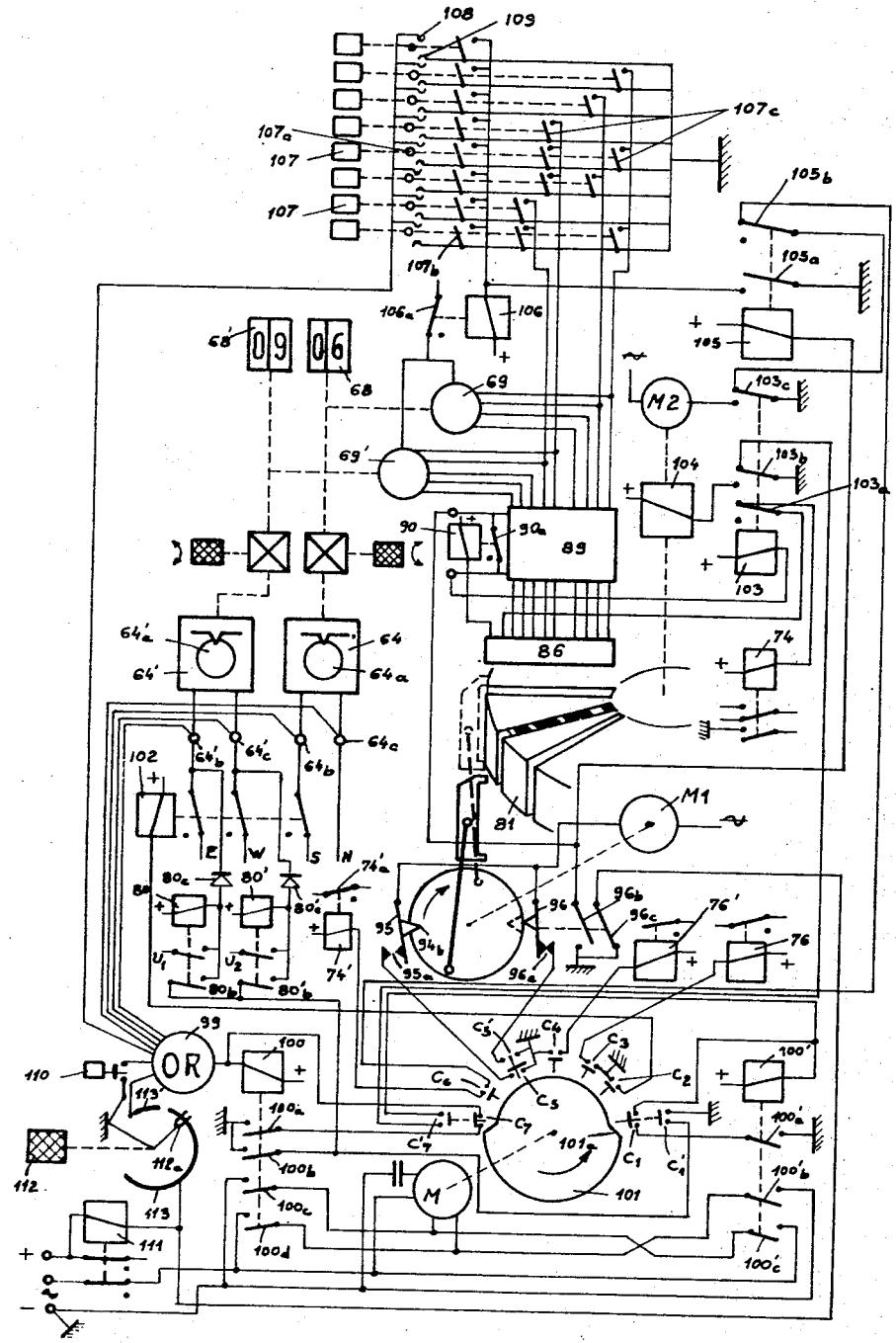

FIG. 19 serves to explain the operation of the complete apparatus.

FIG. 20 shows how the apparatus is secured in the aircraft so as to render the magazine accessible.

Figure 1:
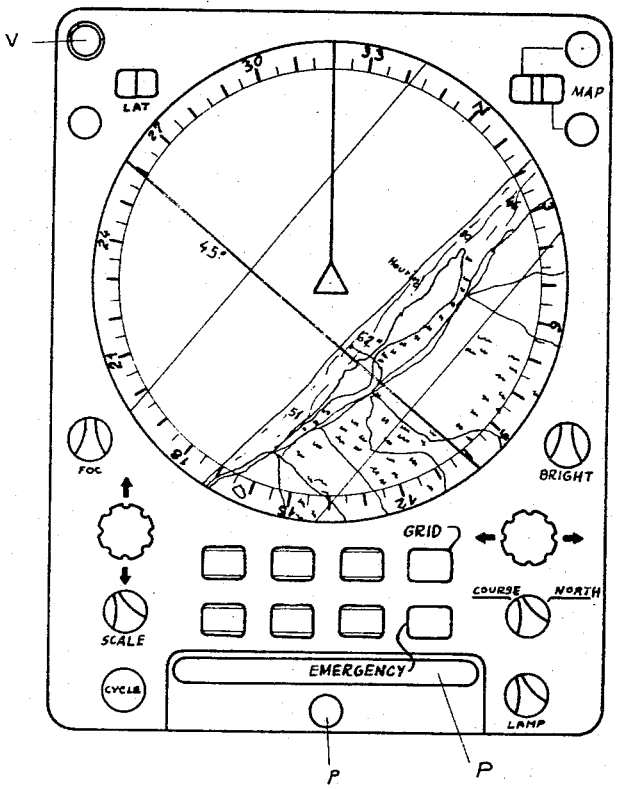
FIG. 1 illustrates the front of the apparatus for a complete explanation of its use.

FIG. 1 illustrates the front of the topography indicator, showing all the features with which the user is directly concerned, as follows:

A circular projection screen onto which the following are projected: a symbol of the aircraft, for example in the form of a triangle and a vector; a geographical map; and a compass rose. The method of navigation illustrated in the figure is the "course" method.

A lamp V which lights if the required map is not in the magazine, i.e., if the aircraft is provisionally flying over an area not originally provided for. The screen is then blank. The lamp goes out when the aircraft returns to a zone covered by a photograph in the magazine.

A latitude display counter together with its control knob.

Map reference number display counters together with two knobs respectively for display of the first and second portions of the number. These portions correspond respectively to the column and line numbers of a grid covering a wide area.

A focussing knob for focussing of the projected image.

A combined on/off switch and brightness control.

A framing knob which in the pulled-out position is engaged with a high step-down ratio (slow speed) and the pushed-in position is engaged with a low ratio (high speed), and which is disengaged in the middle position.

A horizontal framing knob which in the pulled-out position is engaged for slow speed and in the pushed-in position is engaged for high speed, and which is disengaged in the middle position.

Eight press-buttons arranged in two rows, four in each row (FIG. 1) for projection of special photographs on the screen. One of these buttons marked "GRID" allows projection of a small-scale low-detail map showing the entire grid, with the references of each photograph. With the aid of the framing knobs the operator can locate on this map the reference for the photograph showing the area over which the aircraft is flying.

Another one of these press-buttons is marked "EMERGENCY" for projection of instructions in the event of emergency.

The other six press-buttons have removable labels on which can be shown the designation of the area covered by the corresponding special photograph.

A two-position scale knob controls the optical system projection lens turret for selection of one or other magnification. This is a reading scale which has no connection with the scale of the maps and their movement. The change of the reading scale requires no reframing.

A two-position knob for selection of "COURSE" or "NORTH" navigation.

A press-button marked "CYCLE" controls the return of the projected photograph to the magazine and sets the apparatus to automatic operation.

A two-position knob controls both electrical switching for illumination of one or other of the projector lamps and the position of a rotary mirror which provides optical switching.

A handle P enables the complete apparatus to be pulled out to a given position projecting from the wall in which it is fitted, so that the photograph magazine is laterally accessible.

A press-button $p$ enables the apparatus to be locked in the normal position or in the pulled-out position.

Figures 2, 3, 4:
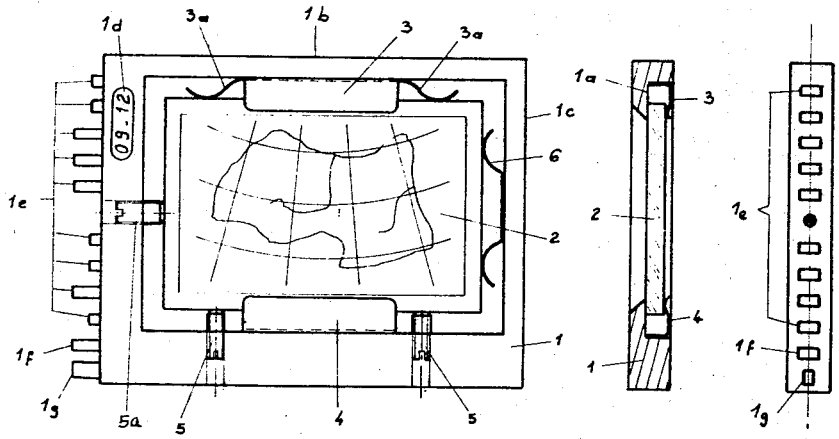
FIG. 2 shows a photograph holder frame.
FIG. 3 is a section showing the position of the photograph in the frame.
FIG. 4 shows the arrangement of the digits forming the binary reference.

FIGS. 2 and 3 illustrate a photograph holder frame 1 bearing the diapositive photograph on a rigid transparent support 2. The diapositive 2 is held firmly by spring 3 and 4 against a reference surface 1a. The arms 3a of the spring 3 hold the photograph in contact with height and orientation control screws 5. The arms of a spring 6 hold the photograph in contact with a width control screw 5a. The sides 1b and 1c are aligned at right-angles and act as a reference for correct fitting in the projection apparatus. 1d is a position provided for writing in the decimal reference of the photograph 2. Studs or projections 1e represent the photograph reference in binary form. The corresponding digits are equal to 1 or 0 depending upon whether the said projections are long or short, i.e. present or absent. Projection 1f denotes one map scale when present and the other scale when absent. Projection 1g controls the safety system which renders reading inoperative if the photograph is not in its exact position. In FIG. 4 it will be seen that the projection 1g is narrower than the projections 1e and 1f. Only when the projection 1g is situated exactly on the axis with which the automatic reader contacts are aligned can reading be operative.

Referring to FIG. 4, if the reader contacts are replaced by a diode associated with a lamp, the rectangles 1e, 1f and 1g do not denote projections seen in end view, but small non-projecting reflecting surfaces.

FIG. 5 is a complete diagram of the optical unit.

A projection lamp 7 having a reflector 7a emits its light to the condenser 10 via a total-reflection prism 8 and a mirror 9 pivoting to two positions. After condenser 10 the rays pass through the heatproof filter 11 to illuminate the transparency, which the frame 1 holds in the object plane of a first centered optical system 12. The image of the map is formed in the focal plane of a second centered system 13; a reticle representing a compass rose 14 is also situated at the focal plane. A stationary total-reflection prism 15 transmits the parallel rays through 90° via a Wollaston prism 16, which is pivotable about its longitudinal axis 16a. The parallel beam leaving the Wollaston prism is reflected by a total-reflection prism 17 to a convergent optical system 18 which forms the image of the card 1 and the rose 14 in the object plane of the projection lens 19, the latter being borne by a turret 20.

The turret 20 bears a second lens 19′ of different magnification which, by rotation of the turret, can be substituted for the lens 19 to change the projection scale. A reticle 21 bearing a stylised symbol to represent the aircraft is disposed in the principal object plane of the lens 19, the said symbol being centered on the optical axis, and the said reticle 21 bearing a vector the origin of which is on the optical axis. This reticle is pivotable about the optical axis. In the position shown in FIG. 5, the optical axis extends through the center 22a of the projection screen 22. The components 18–19–20–21 are mounted in a mechanical unit 23 pivotable about an axis 23a perpendicular to the plane of FIG. 5. In unit 23, prism 17 is pivotable about the same axis 23a situated in the mirror plane; its angular position is determined by a stop 23b on which it is held by a spring 24. Means (not shown) enable the unit 23 to be turned about the axis 23a to bring the optical axis to extend through the plane of the screen 22 at a point 22b situated beneath the center 22a. This position is determined by an adjustable stop 25 co-operating with an arm 23c of unit 23. The stop 26 limits rotation of the prism 17 in a position such that the rotation of the latter is half that of the unit 23. When mirror 9 is rotated through a quarter of a revolution (by means not shown), electrical switching causes the standby lamp 7′ to light instead of lamp 7, and the light from prism 8′ is then transmitted through the optical system. The above-described optical system projects the following onto the screen; the image of the map 1, the image of the rose 14 and the image of the symbol 21 with its vector.

In north method navigation the map and the rose are presented normally and north is at the top of the screen. The reticle 21 of the symbol of the aircraft is controlled by known synchrodetector means (not shown) to rotate in the appropriate direction through the course angle calculated by the navigation computer so that the aircraft symbol and its vector indicate the course on the compass rose and map which are stationary.

In course navigation, however, the aircraft symbol 21 is stationary with its vector extending upwards and the map and compass rose images are oriented according to the course angle. To this end, a known synchrodetector control system (not shown) rotates the Wollaston prism 16 through half the course angle as computed by the navigation computer.

In FIG. 5, the broken-line circle 27 shows the position of the magazine for the photographs. The axis of rotation 27a is in the plane of the photograph frame 1 so that the radial cavities 27b of the magazine can successively come into the object plane and the photographs can be transferred from the magazine to the projection system and vice versa simply by sliding in their plane.

FIG. 6 is a diagram to illustrate the anamorphosis system which converts the rectilinear east-west computed by the navigation computer into a curved movement. Two straight lines 28 and 29 form an angle α in a plane 31, the apex 30 of the angle being on the vertical axis 31a of the plane 31. These two straight lines are controlled to pass through two stationary points 31b and 31c of the plane 31, the said points being symmetrical with respect to the axis 31a, i.e., the angle α has the axis 31a as bisector. The second plane 32 slidable on the plane 31 has a point 32a and two points 32b, 32c which are controlled so as respectively to remain on the straight lines 28 and 29. In a middle position, the point 32a is on axis 31a and the points 32b and 32c are respectively in coincidence with the points 31b and 31c. If point 32a is moved horizontally by means not shown, while having freedom to move slightly in the vertical direction so that the plane 32 has to undergo in either direction a small displacement limited to the end positions 32′ and 32″ shown in broken lines relatively close to the middle position 32, the displacement of the plane 32 is very close to the pure rotation which it would have undergone if the points 32b and 32c had not followed the straight lines 28 and 29 but instead followed the broken-line circle tangential to the said straight lines at the points 31b and 31c, with centre o on the axis 31a, at the point of concurrence of the perpendiculars to the straight lines 28 and 29 from the points 31b and 31c.

For the sake of clarity in the drawing, the angle has been shown with a small opening so that the point o is situated only a short distance away; in actual fact the angle α is much nearer 180° and the center o of the circle is much farther away outside the limits of the diagram in the upward direction (several yards).

The error existing between the real movement and the theorical circular movement is then perfectly negligible. In the control of the total movement of the point 32″a to the point 32′a, the point 32a describes an arc of a circle of a very small angular value. The sine and the arc may be taken as equivalent without any appreciable error. The plane 31 diagrammatically represents the carriage which is controlled to move in parallel relationship to the axis 31a in proportion to the north-south movements of the aircraft as computed by the navigation computer. The plane 32 diagrammatically represents the carriage controlled to move in proportion to the east-west movements of the aircraft as computed by the navigation computer, with the anamorphosis required to allow for the curvature of the parallels of the map 2 used, said map being borne by its frame 1 which is integral with the plane 32. This curvature varies with the latitude; the position of the center of curvature o on the axis 31a must therefore be varied in dependence on the latitude. At zero latitude, in particular, the center o is a infinity, and the straight lines 28 and 29 are in alignment. A cam 33, whose axis 31d is integral with the plane 31, and which rotates in latitude moves the point 30 along the axis 31a to embody this function by varying the angle α.

This operation does not result in originating an error in the position of the map because in the middle position of 32 the reference points 32b and 32c of the plane 32 are on the stationary points 31b and 31c of the straight lines 28 and 29. A change of orientation of the said straight lines changes the radius of curvature without changing the position of the plane 32 with respect to the plane 31.

If the maps used are made to a projection system in which the meridians and the parallels are projected to a rectangular plan (for example direct Mercator maps); the angle α has the value 180°. The two straight lines 28 and 29 are in alignment and form an ordinary rectilinear link.

FIG. 7 is an example showing embodiment of the principle explained with reference to FIG. 6, together with mechanical means for driving and guiding the carriages.

The vertical carrige 31 is guided without any play or friction on two parallel columns 34, 35, for example by means of ball bearings (not shown).

The columns 34–35 are secured to a frame 36. Carriage 31 is driven by an endless thin metal band 37 connected to carriage 31 by a screw 38. Endless band 37 is driven by a driving drum 39, one point of which is connected to the band by a screw 39a to prevent any slip. The diameter of drum 39 is sufficient for the total drive to occur over less than half a revolution and to permit the presence of the screw 39a. The drum 39′ returns the band 37, which is tensioned by a spring 37a. The drum spindle 39b is driven directly by a control system in dependence upon the latitude movements computed by the computer. The sliding element 32 is articulated by two pivots 32b and 32c on two sliding elements 40 which slide on two cylindrical rods 41 borne by two elements 42–43 pivotable on two pivots 31b and 31c connected to carriage 31. The two axes 28 and 29 are thus embodied. An arm 32d sliding in a slot 31e in a projection 31f on carriage 31 causes sliding element 32 to remain in the plane defined by three points 32b, 32c and 32d. Cam 33 controls a sliding element 44 guided by guides 31g. By means of two lugs 44a co-operating with forks 42a and 43a, sliding element 44 varies the position of point 30 at which the axes 28 and 29 intersect the axis 31a. Cam 33 is connected to a gearwheel 33a meshing at right-angles with a helical gearwheel 45 whose vertical spindle borne by bearings 31h is provided with a gearwheel 46 long enough for the teeth not to disengage from those of the control wheel 47 when the carriage 31 describes its total travel. Spindle 47a borne by bearings 36a receives the drive for correction of the angle in dependance on the latitude. Whenever a photograph is used, cam 33 remains fixed in a position determined by the mean latitude of the map. The angle $\alpha$ has a fixed value corresponding to a mean value of the curvature of the parallels. When a change is made to a photograph farther to the north (or farther to the south), spindle 47a is turned in the appropriate direction by a fixed amount corresponding to the latitude variation for one pitch of the grid. The profile of cam 33 is such as to give the angle $\alpha$ the appropriate variation to make it agree with the mean curvature applicable to the next pitch of the grid. Whenever the display counter and the memory encoder corresponding to the grid lines change by one unit, the cam 33 rotates one pitch. The horizontal movement of the carriage 32 is controlled by a thin metal band 48 provided with a reinforcing plate 48a formed with a vertical slot 48b co-operating with the pin 32a. Band 48 is driven by drum 49 whose vertical spindle is supported in two bearings 31i and is provided with a gearwheel 50 long enough for the teeth not to disengage from those of a control wheel 51 when the carriage 31 describes its total travel. To prevent any slip, band 48 and drum 49 are connected at one point by a screw 49a. Drum 52 reverses the band 48, which is tensioned by a spring. Spindle 51a supported by fixed bearings 36b is driven directly by a control system in dependence on the longitude movements computed by the computer.

The photograph frame 1 is slid into a recess in the carriage 32. Resilient means denoted by the single spring 53 ensure that the reference surfaces 1b and 1c of the frame are in contact with the corresponding surfaces of the recess. In FIG. 7 it is assumed that the frame 1 is introduced from the top, but of course it could alternatively be introduced at the side without thereby departing from the scope of the invention.

At zero latitude the angle $\alpha$ is equal to 180°, and the axes 28 and 29 are in alignment. For navigation in the Southern Hemisphere cam 33 brings point 30 above the line of the centers 31b and 31c, the axes 28 and 29 form an angle with the apex at the top and anamorphosis continues to apply. If the maps used are of the direct Mercator type, there is no anamorphosis to be produced and cam 33 is brought to and locked in its position corresponding to zero latitude. Axes 28 and 29 are in alignment and form an ordinary link.

FIG. 8 diagrammatically illustrates the line of drive for the north-south movement of the carriage 31 in cases in which the maps used are Lambert maps. In this figure the broken lines illustrate mechanical connections with the appropriate ratios while the solid lines represent the electrical connections.

The north-south movements computed by the automatic computer and expressed in degrees are transmitted in the form of electrical signals to the control system of conventional type as represented by element 54. The technology of element 54 will depend upon the form of electrical signal (pulses, voltage or synchro signals); in every case the function of the element 54 will be to convert the said signals to a mechanical rotation proportional to the north-south movement.

This rotation is transmitted by an electrically controlled twin-ratio gear box 55 to one of the inputs of the differential 56, the output of which controls the movable element of a potentiometer 57. The voltage from the latter is applied via a summating resistor 58a to the amplifier 58 which supplies the motor 59. The latter respectively controls the north-south carriage control drum 39 and the return potentiometer 60, the voltage of which is applied to the amplifier 58 via resistor 58b.

Two other summating resistors 58c and 58d are normally connected to ground as shown in the figure, and when relay 61 is energised they enable a voltage to be applied via path 61a, the said voltage being proportional to the component $Y = P \cos \theta$ of the aircraft–radio beacon vector. The relay 62 which is energised at the same time as the gearbox 55 enables resistor 58c or 58d to be selected as required according to the scale of the map.

By energisation of relay 61 the voltage Y is added to that of the potentiometer 57 so that the radio beacon shown on the map is brought to the center of the screen in coincidence with the symbol denoting the aircraft (because as we shall see hereinafter a voltage X proportional to the component $X = P \sin \theta$ is simultaneously added to the voltage of the potentiometer 57' in the east-west kinematic chain). If the position indicated is exact, coincidence is obtained but if the position indication has an error, there is no coincidence; however, it can be produced manually by the adjustment knobs to correct the error.

The other input of the differential 56 is connected firstly to two wheels 56a and 56b and secondly by an electric clutch 63 to a stepping element 64 comprising a disc 64a formed with a notch, a complete revolution of this disc corresponding to advance by one step of a fixed amplitude.

A manual framing knob 65 bears two gearwheels 65a and 65b adapted to engage one or other of the gearwheels 56a and 56b when the knob is pushed in or pulled out. A relay 66 is then energised and via the electric clutch 63 disengages the element 64. Movement of the knob 65 will provide fast or slow manual reframing depending upon whether the knob 65 is pulled out or puhsed in. In the middle position of knob 65 the clutch 63 and the element 64 in the inoperative state lock the input of the differential 56.

When the north or south limit of the photograph is reached during operation, the terminals 64c and 64b of element 64 receive an electric signal which starts rotation in the appropriate direction for a complete revolution of the disc 64a. By means of the clutch 63 and differential 56 this rotation moves the potentiometer 57 by an amount corresponding to the height of one photograph. Rotation of the element 64 by one step is transmitted via the differential 67 to the counter 68 to vary its displayed number by one unit (in the appropriate direction), the said number being the line number of the grid corresponding to the photograph in use, so that the number of the line corresponding to the next photograph is displayed.

A memory encoder 69 gives the same indication as the counter 68 in binary form. A knob 67a which is normally locked enables the line number of the first photograph to be displayed via the other input of differential 67. Rotation of element 64 by one step is transmitted via the electrically controlled twin-ratio gearbox 70 to the input of the differential 71, whose output controls the latitude display counter 72 and the triple potentiometer 73. The displayed latitude is thus maintained by successive stages on each change of line of the grid. A normally locked knob 71a enables the initial latitude to be displayed via the other input of the differential 71.

Element 73a of the triple potentiometer 73 delivers a voltage proportional to the latitude for use in the east-west drive chain (FIG. 9) to provide a variation of the scale in dependence upon the latitude.

Depending upon the scale of the photograph selected, i.e., whether the scale digit 1f is of the form equivalent to the value "one" or "zero," contact 103a being closed at the moment of selection, the relay 74 will be energised or non-energised. By means of its armature 74a, the relay 74 either will or will not energise the gearboxes 55 and 57 which will assume one or other ratio, and will or will not energise the relay 62 which by way of the movable armatures 62a and 62b will select whichever of the summating resistors 58c or 58d is to be used if the relay 61 is energised.

Also, by way of terminal 75 armature 74a will or will not control the gearbox 55' and the relay 62' in the east-west line of drive (FIG. 9), the said gearbox and relay being respectively similar to the gearbox 55 and the relay 62.

By way of armature 74b, relay 74 will select one or other of the elements 73b or 73c of the triple potentiometer 73 so as to control the position of the anamorphosis cam 33 in dependence upon the latitude by a conventional control system 33a, according to the scale.

When the photographs used are of the scale corresponding to the operative position of relay 74, the latter is kept self-energised for the entire period of use of the photograph, by means of contact 74a (in the operative position) of the relay 74 and by the contact 74'a which is normally closed in the inoperative position, of the relay 74.

On each change of photograph relay 74' is energised and the self-energisation link 74'a is broken for a short time which completely comes within the period when the scale digit 1f is being read; thus the condition of relay 74 is unchanged if the scale is unchanged on changeover from one photograph to another.

This precaution is important in order to prevent unnecessary change of the state of the gearboxes 55 and 70 on each change of photograph. The reason for this is that on each change the said gearboxes may undergo displacement by a few teeth and if this were repeated frequently it would introduce an appreciable error. When there is a change of scale such displacement is unimportant since manual resetting is necessary in any case. The connection between the potentiometer 57 and the summating resistor 58a is via the armature 76a in the inoperative position of relay 76. When a photograph is changed, relay 76 is energised, and armature 76a in the operative position connects resistor 58a to ground so that the north-south carriage 31 is moved to the end of the south travel. At the same time, armature 76b of relay 76 which, in the inoperative position, connected one of the elements 73b or 73c to the control system 33a, switches the latter to a fixed voltage U' so that the anamorphosis cam 33 assumes a position such that the two straight lines 28 and 29 are in alignment, angle α having the value 180°.

At the same time armature 76c of relay 76 breaks the supply to the relay 61 so that whichever of the resistors 58c, 58d received the voltage $Y=P \cos \theta$ of the radio beacon is grounded.

FIG. 9 diagrammatically illustrates the line of drive for the east-west movements of the carriage 32 and a considerable number of the components are similar to those shown in FIG. 8. Such components bear the same reference numeral with the prime index.

The east-west movements computed by the navigation computer and expressed in degrees longitude are introduced in the form of electrical signals to the control system 54' which converts them to a proportional rotation which is transmitted by the twin-ratio gearbox 55' and differential 56' to the slider 57' of a potentiometer. Slider 57' delivers a voltage to the amplifier 58' via resistor 58'a. Amplifier 58' controls motor 59' which drives the east-west carriage drive drum 49 and the control return potentiometer 60', the voltage of which is returned to amplifier 58' via resistor 58'b.

Two summating resistors 58'c, 58'd, normally connected to ground are shown in the drawing, allow a voltage proportional to the component $X=P \sin \theta$ of the aircraft–radio beacon vector to be added to the voltage of potentiometer 57' if relay 61' is energised.

Depending upon the scale of the map used, relay 62' which is or is not energised selects one or other of the resistors 58'c or 58'd from the terminal 75. Terminal 75 also controls selection of one or other ratio of the gearbox 55'. The other input of differential 56' is connected to two gearwheels 56'a, 56'b and via a clutch 63', to a shaft braked by the electric brake 77.

For manual reframing, the two gearwheels 56'a, 56'b can be engaged with two gearwheels 65'a and 65'b connected to the east-west reframing knob 65'. Relay 66' is then energised and clutch 63' is in the disengaged position. Since the longitude degree is represented on the map (Lambert) by a length which varies in dependence upon the latitude, the potentiometer 57' instead of being fed with a fixed voltage is fed in dependence on the latitude via potentiometer 73c (FIGS. 8 and 9) and an amplifier (not shown). Reframing by one step on a change of photograph in the east-west direction is not represented by a constant mechanical movement of the slider of potentiometer 57' but displacement of said slider between two points at which the voltages U1 and U2 delivered by the potentiometer 57' have a fixed value. This readjustment is effected as follows: relay 76' is energised, contact 76'a switches slider 57' to the amplifier 78, contact 76'b releases brake 77, and contact 76'c feeds the control system motor 79.

Depending upon whether the limits of the previous photograph left to the east or the west, relay 80 is energised and in the operative position its armature 80a delivers the fixed voltage U1 to amplifier 78 or alternatively relay 80' is energised and in the operative position its armature 80'a delivers the fixed voltage U2 to the amplifier 78.

Motor 79 rotates and by means of the clutch 63' and differential 56' drives the slider 57' in the appropriate direction until the voltage delivered by 57' is equal to the voltage U1 or U2 selected by the relay 80 or 80'.

The relay 80 or 80' is triggered by pulses E or W from selector logic circuits (see FIG. 12), and is then kept self-energised by the armature 80b or 80'b (FIG. 19). Diodes 80c and 80'c are incorporated in the trigger circuits so that self-energisation of the relays 80 and 80' does not interfere with the logic circuits.

During the preceding operation, a contact 76'd grounds the resistor 58'a; the east-west carriage 32 controlled by drum 49 is sent to the end of the west travel, and this is the appropriate position for the change of photograph. An armature 76'c of relay 76' breaks the circuit of relay 61' thus grounding whichever of the resistors 58'c or 58'd received the voltage $X=P \sin \theta$ of the radio beacon.

FIG. 10 shows the system for maintaining the display of the column number of the photograph for selection. When the photograph leaves by the east or west limits, the logic circuits pass an electric signal E or W to the terminals 64'c and 64'b of the system 64', the disc 64'a of which performs a complete revolution in the appropriate direction. The column number displayed on counter 63' is changed by one unit more or less, the memory encoder 69' indicates the same value expressed as a binary value. The differential 67' and knob 67'a enable the column number of the initial photograph to be displayed manually.

If the apparatus is provided for Mercator maps, the drive systems will be different inasmuch as there will be no correction with latitude in the east-west chain.

The counters 68' and 69' which display the column number could then be maintained directly by the change of photograph, each photograph corresponding to a fixed number of degrees longitude.

On the other hand, there would be a correction with latitude in the north-south movement and since each photograph does not correspond to a fixed number of degrees latitude the drive would have to be separated from the stepwise movement of the grid on each change of photograph in the north-south direction and counter 68 and encoder 69 would be maintained in a similar manner to that shown by the elements 68' and 69' in FIG. 10.

FIG. 11 shows the logic equations for selection of the next photograph. In the grid, the lines are assumed to be numbered in sequence from north to south and the columns in the sequence from west to east. When the photographs limits denoted by the rectangle 2 are left in the north direction, a precontact $a$ is first encountered and closes, although this will not be discussed at this stage, and then a main contact A. Closure of contact A causes element 64 (FIG. 8) to be driven in the appropriate direction to reduce the number displayed on the counter 68 and the encoder 69 (as a binary value) by one unit. Thus the line number of the next map situated further north than the map in current use is displayed.

On completion of this selection the photograph changing process is initiated as will be discussed hereinafter. The abbreviations N. E. S. W. will be used hereinafter to denote the actions required for a change to be made respectively to a photograph situated further, north, east, south and west:

N denotes the addition of −1 to counter 68 and encoder 69.

E denotes the addition of +1 to counter 68' and encoder 69'.

S denotes the addition of +1 to counter 68 and encoder 69.

W denotes the addition of −1 to counter 68' and encoder 69'.

The references, A, B, C, D will be used to denote the like contacts in the closed state (the open contacts are considered as being absent). We may therefore write that A is required for N, and so on, as follows:

$$N=A$$
$$E=B$$
$$S=C$$
$$W=D$$

These equations would be adequate if the limits were always left in the direction of one of the cardinal points. We shall use the reference $a, b, c, d$, to denote the like precontacts in the closed state (in the open state they may be considered as absent).

If we have B and $a$, then E is required; the next photograph is farther east but the presence of $a$ shows that it must also be farther north, and therefore N is also required as follow:

$$N=A+aB$$

which means that the simultaneous presence of $a$ plus B is a case in which N has to be carried out.

Similarly, if we have A and $b$ it means that N is required; the photograph to be selected is farther north but the presence of $b$ shows that it must also be father east. E is therefore necessary as follows:

$$E=B+bA$$

which means that the simultaneous presence of $b$ plus A is a case in which E has to be carried out, and so on, and by allowing for every case we have the following logic equations:

$$N=A+aB+bA+aD+dA$$
$$E=B+bC+cB+bA+aB$$
$$S=C+cD+dC+cB+bC$$
$$W=D+dA+aD+dC+cD$$

and these equations are reduced to the following:

$$N=A+a(B+D)$$
$$E=B+b(C+A)$$
$$S=C+c(D+B)$$
$$W=D+d(A+C)$$

In practice, the contacts A $a$ B $b$ etc. are not controlled by the carriages 31 and 32 but by cams connected to the drums 39 and 49.

For the sake of clarity, we assumed that A $a$ etc. denoted closed contacts, but it would also be possible to use the armature of normally closed contacts. This might simplify the technology. For example: $a$ is one of the normally closed contacts of a switch which opens when the single movable element beings to pivot, and then closes A.

A knowledge of the above logic equations is enough for those versed in the art to use conventional means, e.g. "OR" and "AND" gates for the design of logic circuits allowing the N and S actions to be carried out at the terminals 64c and 64b of the element 64, and the actions W and E at the terminals 64'c and 64'b of the element 64' to display the line and column numbers of the next photograph on the counter 68 and 68' and the corresponding encoders 69 and 69'.

These logic circuits are shown diagrammatically in FIG. 12, in which the contacts A B C D $a$ $b$ $c$ $d$ are connected to the like horizontal lines and the "AND" and "OR" gates are shown by circles of the same name.

The "AND" and "OR" gates can conventionally consist of electronic components or appropriately associated relays. FIG. 12 also shows that the terminals 64'b, 64'c of element 64' which receive the signals E and W and the terminal 64b of the element 64 receiving the signal S are connected to the logic circuits by the armatures 102a, 102b, 102c in the inoperative position of relay 102.

After reception of the N S E W signals which control the display of the reference of the next photograph, in a stage of the photograph changing process, the relay 102 is energised thus breaking the connection between the logic circuits and the terminals receiving the S E W signals.

This break is required because other stages in the photograph changing process include rejection at the end of the south travel and rejection at the end if the west travel. This required departure of the map limits must not result in a new change of the reference displayed on the encoders 69 and 69' and the counters 68 and 68'. Also, since relay 80 is energised by the limits leaving at the east, the relay 80' must not also be energised when carriage 32 sent to the end of the west travel is about to leave the west limits.

FIG. 13 illustrates the magazine diagrammatically. It consists of a cylindrical drum 81 mounted on a spindle 82 with a rapid assembly system (not shown). Drum 81 has radial cavities 81a into which the photograph frames 1 are introduced at the top. The frames 1 are held by an easy fit in the cavities by resilient means (not shown). The cavities 81a lead to the outside by slots 81b along the cylinder generatrices, these slots being intended for the passage of the transfer element. A number of cavities intended for special photographs are masked by a sector 83 which has a fixed code for each cavity, the said code consisting of the digits 83e, 83f and 83g which, for reading, are substituted for the digits 1e, 1f, 1g, which may be present on the special photographs situated beneath the fixed mask.

Reference 83e denotes the reference digits, 83f the scale digit, 83g the safety digit. The fixed mask 83 has a serial number for each cavity, the said serial number corresponding to the press-button of the same number on the front of the apparatus.

The safety digits 1g and 83g are narrow and their position is farther away from the center 82; they cover a smaller angle which is fully contained inside the smaller angle covered by any other digit. As a result, when they can be read by the automatic reader, the other are certainly readable.

To prevent the frames 1 leaving their cavity, for example as a result of vibration, drum 81 rotates with a slight clearance against a polished plate 84 formed with a radial slot 84a situated in the same plane as the plane of movement of the east-west carriage 32 (FIG. 7).

When a cavity 81a coincides with the slot 84a, the photograph 1 it contains can be pushed down through the slot 84a to be introduced into carriage 32.

Drum 81 is then locked mechanically by bolt 85 pivotable about a fixed axis 85a (orthogonal to axis 82) and co-operating with the corresponding slot 81b. After use, the photograph is returned to its cavity; bolt 85 is lifted and the drum can rotate to present the next photograph.

FIG. 14 shows the construction of the automatic reader for selection of the photographs. The automatic reader 86 is disposed radially above the top of the magazine 81 and is situated in the fixed vertical plane passing through the slot 84a of the plate 84, i.e. the plane in which the photograph is required to be situated after selection. A number of apertures 86a (equivalent to the number of digits) are formed in the block 86 and their axes interesect the top surface of the magazine 81 at points aligned along a radius and spaced from the axis 82 by an amount equal to the distance between the different digits. Each aperture 86a contains a small lamp 87. Thus when a photograph is present beneath the reader all the digits are illuminated.

Associated with each aperture 86a is an aperture 86b containing a miniature photodiode 88. The axis of an aperture 86b intersects the top plane of the magazine 81 at the same point as that of the associated aperture 86a. The axes of two associated apertures 86a and 86b are also inclined with respect to the normal to the top plane of the magazine contained in their plane. The "1" digits are denoted by a small reflecting surface. The "0" digits, the edge of the frame 1 and the top surface of the magazine are of a matt non-reflecting black colour. If, while the magazine 81 is turning, a frame 1 is situated beneath the reader 86, each "1" digit receives a beam of light from a lamp 87 and reflects it to the associated photodiode 88 which becomes conductive and is equivalent to a closed contact.

The first diode, the one farthest away from the center, controls safety and reading. The second controls the scale. All the others assume a state which reproduces the reference of the photograph in question.

A comparator 89 is connected firstly to the automatic reader and secondly to the memory encoders 69 and 69'. When the reference read by the reader agrees with the reference registered in the encoder, rotation of the magazine stops. FIG. 15 shows a relay type comparator construction chosen by way of example, but there are of course other means of constructing a comparator, inter alia from electronic components. In FIG. 15, the broken-line frame 89 bounds the actual comparator. Each digit of the order 1, 2, 3 . . . n of the enclonders 69 and 69' when it has the value "1" controls a relay of the same order R1, R2, . . . Rn, only the movable armature of which has been shown. The movable armatures Ri are all connected to terminal 89a. Each digit of order 1, 2, 3, . . . n of the reader when it has the value "1," controls a relay of the same order R'1, R'2, . . . R'n, only the movable armature of which has been shown. The movable armatures R'i are all connected to terminal 89b. The operating contact of each relay Ri is connected to the non-operating contact of the relay R'a of the same order and, conversely, the operating contact of each relay R'i is connected to the non-operating contact of the relay Ri of the same order as shown in FIG. 15. From the latter figure it will be apparent that if at least one relay R'i is in the opposite state to the relay Ri of the same order, i.e., if at least one digit of the order i of the reader is of a different value from that of the digit of the same order i of the encoder, an electrical connection is maintained between the terminals 89a and 89b. If all the digits of the reader have the same value as the digits of the same order in the encoders, i.e., if the reference read by the reader agrees with that recorded in the encoders, there is no longer any electrical connection inside frame 89 between terminals 89a and 89b. It will readily be seen that the comparator 89 can be used as a means of stopping the drive for the elements providing rotation of the magazine, motor, clutch etc.

When the photograph whose reference is identical to that recorded in the encoders is present beneath the reader, rotation stops. One precaution is required: there is a complete angular range during which reading is operative; the rotation, however, must be stopped in an exact position. The digits closest to the axis start to influence the reader while those which are farther away are not yet within the field of the reader; there is therefore a period during which reading is incomplete and the incomplete reading of a reference might possibly be exactly identical to the reference recorded in the encoder, so that stoppage would occur on the incorrect map. To obviate these disadvantages, terminals 89a and 89b are connected by the non-operating armature 90a of relay 90, the latter being energized at the exact time when the safety digit 1g or 83g (which is narrower than the others and covers a small angle $\beta$ entirely within the smallest angle $\gamma$ covered by another digit) actuates the reader.

The energized relay 90 breaks the connection which its armature 90a has established between the terminals 89a and 89b and if the photograph beneath the reader has the same reference to that recorded in the encoders it causes the magazine to stop in the required accurate position. If the references of the photograph and in the encoders are not identical, rotation continues.

FIG. 16 is a diagram showing the transfer system for bringing a photograph from a cavity 81a of the magazine 81 and then, after use, returning the same to the magazine. The plane of the figure is the one in which the east-west carriage and the slot 84a of the plate 84 are situated. For the sake of clarity we shall assume that the optical system has an even number of centered systems, i.e., the image of the map is not reversed on projection. The broken-line frame 91 whose center 0 is the point representing the position of the aircraft, which is denoted on the screen by a symbol, is the maximum surface that can covered by the photograph 1 during normal use. The photograph 1 in use is moved by the navigation system in the direction of arrow f. The point 0 will leave it by the right, i.e. by the east. The photograph will come to the limit of the frame 91 on the left. The contact B mentioned hereinbefore closes and controls the action of increasing by one unit the column number recorded in the counter 68' and the encoder 69', i.e., to give the reference of a photograph situated farther to the east. Relay 76 is energized, contact 76a is grounded and relay 61 is disconnected by the armature 76c of relay 76 (FIG. 8), so that the photograph is sent to the end of the south travel in the direction of the arrow f1 and passes the frame 91 in the upward direction (the point 0 has left the map by the south). At the same time, relay 102 has disconnected circuits as appropriate so that the departure at the end of the travel does not result in a new change of reference on the counters 68-68' and encoders 69-69'. Relay 76' is then energized, 61' is de-energized (FIG. 9) with simultaneous reframing of the grid by one step in the west direction on potentiometer 57' and movement of carriage 32 to the end of the west travel in the direction of f2, frame 91 being passed to the right. In this position, frame 1 (shown in broken lines) is engaged between the lugs 92a and 92b of the slider 92 which forms the transfer element. Slider 92 is connected to a link 93 articulated on a crank 94a of a disc 94 which can rotate in half-revolution increments in the clockwise direction. Disc 94 rotating by a half-revolution lifts the slider 92 which drives the frame 1 through the slot 84a in the plate 84 to introduce it exactly into the cavity 81a of drum 81 in the direction of f3. At the end of its travel slider 92 has lifted bolt 85. When it stops, crank 94a is not at the top or bottom dead-center position but is slightly beyond these points so that after the slider 92 has brought the frame 1 into position in the magazine 81 it goes down again so as to share the clearances between the frame 1 and the lugs 92a and 92b so as to allow rotation of the drum 81 without any risk of friction. Magazine 81 is then rotated to select the next photograph which will then be situated between the lugs 92a and 92b of the slider 92 in the top position. A fresh half-revolution of disc 94 will bring slider 92 into the bottom position so that the next photograph is driven in the reverse direction to arrow f3 to reintroduce it into carriage 32. Bolt 85 drops into slot 81a which has just been released. Relay 76' is de-energized, and 61' is possibly re-energized, the photograph leaves the west end of travel along part of the arrow f2 in the opposite direction. Contact 76a is returned to the normal position, relay 61 is possibly re-energized, so that the photograph leaves the south end of travel position and is brought in the direction of arrow f4 to the normal position for use.

FIGS. 17 and 18 illustrate one advantageous embodiment of the encoders 69 and 69' which can of course be of any conventional type, inter-alia of the dry contact type co-operating with a printed circuit disc, but the features will have to be known for an understanding of the principle of general operation as shown in FIG. 19.

The encoder 69 proposed comprise a frame 69 of which a part 69a acts as a bearing for a spindle 97a connected to a drum 97. Part 69a also acts as a support for a reader similar to reader 86 (FIG. 15) consisting of a pair of concurrent apertures 86'a, 86'b for each digit. Each aperture 86'a contains a small lamp 87 and each aperture 86'b a photodiode 88. The inner surface of drum 97 is polished and acts as a reflecting mirror so that after reflection, the light emitted by lamp 87 is received by the diode 88 associated therewith and which becomes conductive and equivalent to a closed contact. The reflecting surface is masked by a thin cylinder 98 of a matt non-reflecting colour fitted with a force-fit inside the drum 97. The code is produced by apertures 98a formed along a generatrix of the cylinder 98 to show the reflecting surface. The digits of value "1" are denoted by an aperture 98a and the digits of the value "0" have no aperture. The encoder comprises many generatrices perforated in this way and evenly distributed over the circumference as there are encoded values to be produced. (This is 16 in the case of encoder 69 corresponding to the 16 grid lines and 32 in the case of encoder 69' corresponding to 32 grid columns.) Two consecutive generatices correspond to encoded values differing by one unit. This system of encoder has the advantage of doing away with contacts (the disadvantages of which are well known) and in particular it facilitates switching when one and the same element—for example the comparator 89—has to be controlled in one case by an encoder and in another case by another means or another encoder. To break the electrical connection between the encoder and the controlled element 89 the supply to lamps 87 is simply disconnected and this system prevents any interference with the control of the said element by any other means.

FIG. 19 will serve for an explanation of the complete operating cycle. The simplest means is to start this cycle when one of the photographs is in use with the apparatus operative. The particular cases of starting, manual return of the photograph in use to the magazine, change to special photogaphs by manual control of the press-buttons, stoppage of the apparatus, are then readily understandable if the complete cycle is considered from a specific point. When the navigation reaches the limit of the map, the sequence of operations to be performed is as follows:

(1) One or two of the signals N, E, W, S are transmitted by the logic circuits (FIG. 12) for display of the reference of the next photograph; possible selection of the voltage U1 or U2 (FIG. 9) for stepwise east or west movement of the grid and triggering of the photograph changing process.

(2) Breaking of E.W.S. signal input paths.

(3) Carriage 31 sent to south end of travel, and anamorphosis cam 33 moved to a favourable position.

(4) Carriage 32 moved to west end of travel.

(5) Disc 94 rotated through half a revolution to return used photograph to magazine and release the mechanical interlock.

(6) Voltage applied to comparator 89 to rotate magazine and select next photograph.

(7) Selection of photograph and stoppage of magazine.

(8) Opening of self-energization contact 74'a of scale control.

(9) Closing of contact 74'a.

(10) Rotation of disc 94 by half a revolution to transfer next photograph from magazine to carriage 32 and relock the magazine mechanically.

(11) Leave the west end of travel.

(12) Leave the south end of travel and return anamorphosis cam 33 to normal position.

(13) Re-establish the E.W.S. signal paths.

In detail, these operations are as follows:

(1)(a) When the limit of a photograph is reached one or two of the N.E.W.S. signals from the logic circuits (FIG. 12) is received by one or two of the elements 64, 64' via the like leads (FIG. 19) so as to change the displayed value by one unit in the appropriate direction in one or both of the counters 68–68' and the binary value in one or both of the encoders 69–69' so as to convert the reference of the used photograph to the reference of the next photograph.

(b) At the same time, the one or two N, E, W, or S signals energizes relay 100 via the "OR" gate 99, and armature 100a of the relay and the normally closed contact C7 cause the relay to remain self-energized. The armatures 100b, 100c and 100d pass to the operative position (closed circuit).

(c) At the same time, if one of the signals E or W exists, one of the relays 80 or 80' is energized to select voltage U1 or U2 via one or other of the armatures 80a or 80'a for stepwise movement of the grid in the appropriate direction (FIG. 9). Relay 80 or 80' remains self-energized by way of armatures 80b or 80'b and armature 100b. The diodes 80c and 80'c prevent self-energization of the relays 80 and 80' from acting as a permanent E. or W. signal.

(d) At the same time, the armatures 100c and 100d feed the motor M for driving a cam 101 in the direction of the arrow and trigger the photograph changing process.

(2) By way of the incline 101a, cam 101 first closes contacts C1 and C'1, the function of which will be explained hereinafter, and then contact C2 which energizes relay 102 (FIGS. 19 and 12), of which the armatures 102a, 102b and 102c break the paths for the signals E, W, and S before the discs at 64a and 64'a have finished their complete revolution.

(3) Cam 101 closes contact C3 which energizes relay 76 (FIGS. 8 and 19), of which armature 76a earths the resistor 58 to bring the slider 31 controlled by drum 39 to the south end of travel, and of which another armature 76b switches the control system 33a of the anamorphosis cam 33 to a fixed voltage U' to bring the cam to a position appropriate to the change of photograph. A third armature 76c breaks the circuit of the relay 61. The movement to the south end of travel takes place before the disc 64a of element 64 has performed a complete revolution.

(4) Cam 101 closes contact C4 which energizes relay 76' (FIGS. 9 and 19) of which armature 76'd switches resistor 58'a to earth and armature 76'e breaks the circuit of relay 61' to bring the carriage 32 controlled by a drum 49 to the west end of travel.

(5) Cam 101 breaks contact C5 and closes C'5, thus feeding via the closed contact 96a the motor M1 which drives disc 94 in direction of arrow until notch 94b registering with the butt of the catch 96 (position shown in broken lines) enables the circuit to be broken at 96a with resultant stoppage of motor M1. The used photograph has been returned to the magazine, the mechanical interlock of which is discontinued as shown in FIG. 1.

(6)(a) By grounding of armature 96b, as catch 96 drops into notch 94b it feeds a relay 103 via comparator 89, the armature 103a of the relay in the operating position breaking the scale relay circuit 74 (FIG. 8); another armature 103b controls the brake clutch 104 which, when energized, released a brake and couples magazine 81 to motor M2.

Motor M2 is fed via armature 103c. Clutch 104 is required to avoid the need to brake the motor and its reduction gear when the magazine 81 stops abruptly.

(b) At the same time, grounding of armature 96b provides supply to the delay relay 105 which passes to the operating position with a delay greater than the time required for a complete revolution of the magazine, and the function of which will be apparent hereinafter.

(7)(a) When the next photograph is beneath the reader 86, the comparator 89 no longer connects to the relay 103 which remains supplied by the contact 91a in the inoperative position of the relay 90 (FIGS. 15 and 19). When the next photograph is exactly at the required place, the relay 90 is energized by the safety digit 1g, the armature 90a in the operative position ceases to feed the relay 103 which, in the inoperative position, causes disengagement and braking by element 104 of magazine 81.

(b) The armature 103a in the inoperative state allows the scale digit 1f to be read and if it is of the value "1" it energizes the relay 74 (FIGS. 18 and 19).

(8)(a) Cam 101 closes the contact C6. When selection is complete, relay 103 is no longer energized and by way of its armature 103c in the inoperative state it energizes the relay 74' but only if the armature 105b of the relay 105 is itself in the inoperative state, i.e., if the photograph was selected in the first revolution of the magazine, in other words if it really was present there. Under these conditions armature 74'a passing into the operative position breaks the self-energizing circuit of the scale relay 74. This breaking of the circuit at 74'a (FIGS. 8 and 19) enables self-energizing of the relay 74 to be stopped and the change of scale to be allowed if the scale digit of the previous photograph was of the value "1" and that of the new photograph is of the value "0." If the next photograph has a digit of value "1" the breaking of the circuit at 74'a has no effect since the digit then directly feeds the relay 74 via the reader 86 to confirm the scale.

(b) On the other hand, if the relay 105 is not in the inoperative state, it means that the photograph required is not in the magazine and that the "master" photograph has been selected. This photograph has no scale digit but the scale (no matter what it was) of the previous photograph must be retained, and that is why the relay 74' is not energized so as not to break the self-energizing circuit of the scale relay 74 at 74'a.

(9)(a) Cam 101 breaks the self-energization circuits of relay 100 at C7 and motor M no longer has any supply.

(b) At the same time, C'7 is closed and on completion of selection relay 103—by way of its armature 103b which drops into the inoperative state—energizes relay 100' which remains self-energized by its armature 100'a and the closed contact C1.

By way of 100'b the relay 100' supplies current to the motor M with a reversal of the phase. Cam 101 returns in the opposite direction of the arrow, re-closes C7 and breaks C'7.

(c) Contact C6 is broken, relay 74' is no longer energized and re-closes the contact at 74'a (FIGS. 8 and 19).

(10)(a) Cam 101 opens C'5 and closes C5 which by way of 95a which is then closed, supplies the motor M1; disc 94 rotates, pushes back catch 96, closes 96a, opens 96b, thus breaks the supply to the comparator 89 and the relay 105, and closes 96c, which will be discussed hereinafter.

(b) The disc performs a half-revolution so that a fresh photograph is transferred from the magazine to the carriage 32 (FIG. 15). The catch 95 dropping into the notch 94b breaks 95a.

(11) Cam 101 opens C4; relay 76' (FIGS. 9 and 19) no longer being supplied, carriage 32 leaves the west end of travel and resumes its normal operating position. Relay 61' is possibly re-energized.

(12) Cam 101 opens C3; relay 76 (FIGS. 8 and 19) no longer being supplied, the carriage 41 leaves the south end of the travel and resumes its normal operating position, the anamorphosis cam 33 resumes its normal position and the relay 61 is possibly re-energized.

(13)(a) Cam 101 breaks C2; relay 102 comes into the inoperative state and restores the paths E–W–S.

(b) Cam 101 reaching the starting point breaks C1; relay 100' in the inoperative state stops the rotation of motor M and of cam 101.

Contact C'1 is also opened, whichever of the relays 80 or 80' may have been energized is returned to the inoperative state. The cycle is ready to restart.

Special cycles are possible:

A first special case is one in which the photograph whose reference is recorded in the encoders 69–69' is not in the magazine 81. Selection cannot take place in the first revolution of the magazine and the delay relay 105 has time to pass to the operative position.

The supply to the lamps of the encoders 69–69' is by way of the inoperative armature 106a of a relay 106. Relay 106 is energized via armature 105a and breaks the supply to the encoders which return to the reference 00.00 which is precisely the reference of a "master" photograph selected by the safety digit 1g provided in the magazine specially so that the absence of any map will not interrupt the automatic cycle. The "master" map used is advantageously the grid map which by the referenced grid lines enable the pilot to assess where he is situated in the part of the zone covered by the absent map.

A second special case is that of manual section of a special photograph:

When one of the eight press-buttons, e.g. 107, provided on the front panel is actuated, a plunger 107a passes a pulse to an "OR" gate 99 by temporarily connecting one of the contacts, e.g. 108, to one of the contacts, e.g. 109. This pulse immediately triggers the general cycle as from the second operation.

A contact, e.g. 107b, is closed and energizes the relay 106 which, breaking the supply to the encoders 69–69', eliminates the references displayed there. One or more contacts, e.g. 107c, are closed to a fixed code (one per press-button) using only the two digits of the lowest value of each encoder 69 and 69' and connecting ground to the corresponding digits of the comparator 89. Selection is carried out to the fixed code which is substituted for the encoders 69–69'. Actuation of another press-button, 107, mechanically returns the previously actuated press-button and selects another special photograph. The special photographs can also be selected by displaying their references on the counters 68–68'. A return is made to the general case and the automatic operation can be used for navigation on the special photographs.

A third special case is where button 110 is actuated, which is marked "cycle" on the front panel of the apparatus. Actuation of the button 110 mechanically returns the actuated press-button 107 and by a pulse to the "OR" gate 99 triggers a cycle as from the second operation to select the photograph whose reference is displayed in the encoders 69–69'.

If no previous press-button 107 has been actuated, pressure applied to 110 will return to the magazine the photograph at present being used and result in re-selection of the same photograph. This is a check on operation.

A fourth special case is that in which the apparatus is stopped. The apparatus is fed with DC and AC by the armature in the operative position of the relay 111, the circuit of which is closed by actuation of knob 112 (marked "lighting" on front panel) in the clockwise direction. Contact 112a, which is grounded, connects a conductive strip 113 which is also connected to relay 111. The spindle of knob 112 also controls a rheostat (not shown) for adjustment of the brightness of the projection lamp. The strip 113 therefore covers a considerable part of the circumference. During use of the photograph the circuit of the coil 111 is also kept closed by contact 96C.

To stop the apparatus, knob 112 is turned in the anticlockwise direction so that brush 112a is brought onto the strip 113′ connected to the "OR" gate 99 which controlled in this way triggers the general cycle as from the second operation.

The cycle continues to the end of the fifth operation in which the disc 94, having performed a half-revolution, has returned the photograph to the magazine, and, presenting its notch 94a in register with the catch 96, enables the latter to drop thus breaking contact 96c. Relay 111 is no longer energized and breaks the general supply to the apparatus.

A fifth special case is the starting of the apparatus:

Knob 112 is turned in the clockwise direction so that relay 111 is energized via brush 112a and strip 113 to feed the apparatus. Knob 112 is turned until the required brightness is obtained on the screen.

Brush 112a has two contact arms so that one of said arms is already in contact with the strip 113 at the beginning and controls the general supply via the relay 111 while the other arm of the contact 112a is still in contact with the strip 113′, so that relay 100 can be re-energized via the "OR" gate 99 and the cycle interrupted at stoppage after the fifth operation (return of photograph to the magazine) can be continued as from the sixth operation (selection of photograph).

If it is required that the first photograph introduced should be one of the special photographs, inter alia the grid map which enables the pilot to find the references for display for selection of the initial photograph, the corresponding press-button is actuated before the knob 112 is rotated.

Of course, all the embodiments are given solely by way of example without any limiting force and in particular the embodiment illustrated diagrammatically in FIG. 19 could be designed to perform the same programme with quite different means, e.g., logic circuits comprising relays or electronic components, without using a cam programmer, without thereby departing from the scope of the invention.

Finally, FIG. 20 shows how the apparatus which is normally embedded in a wall 114 can be pulled out by the handle P and be locked in the pulled-out position by a bolt controlled by the member p to provide lateral access via the dor 115 to the magazine 81 for installation, removal and replacement.

What I claim is:

1. In an aircraft topography indicator controllable by a navigation computer yielding flight data of the speed, direction and drift type for continuous indication of the position of an aircraft by the projection onto a screen of a map of the area over which the said aircraft is flying, the aircraft being represented by a symbol projected onto the same screen over which the image of the map passes, the said map being movable, associated with identification means, and having its movements controlled by the said navigation computer, comprising: projection means consisting of at least one light source, an optical system and a projection screen, the symbol denoting the aircraft being disposed in an object plane of the optical system so as to be projected on the said screen; a magazine to contain detachable individual maps of the area over which the aircraft is to fly, the maps together forming a grid; carrier means whose orthogonal movements are controlled from the navigation computer to move the map in its object plane during its projection; selection means whereby a map corresponding to the area over which the aircraft is next to fly is selected from the individual maps in said magazine in dependence on the position of the map still being projected onto the screen and the position occupied by the next map in the grid; and transfer means controlled by the said selection means for individually bringing each of the individual selected maps into an object plane of the optical system for projection on to the said screen and for return to the said magazine; said individual map magazine being movable with respect to the object plane provided for the map being projected, said individual map magazine having compartments to contain the said maps, the said compartments communicating with the exterior through apertures for the passage of the maps and apertures for the passage of the transfer means, the movement of said individual map magazine being controlled automatically so that it stops and presents the compartments containing the sleected individual map to the said object plane so that said map can be projected, said magazine maintaining the stopped position until the map which has been removed from its compartment has been returned into the same.

2. A topography indicator as set forth in claim 1, wherein the map magazine is a rotary drum wherein the map compartments are substantially radial cavities each having a radial slot on one surface of the drum to allow the passage of the map they contain to allow the removal of such map and its introduction into the object plane of the optical system and the return of the map to its cavity, and a slot parallel to the axis of rotation of the drum so that the said map can receive a movement of translation by the transfer means.

3. A topography indicator as set forth in claim 1, wherein each individual map consists of a rigid and plane diapositive photograph and also comprising a rigid frame for each map, in which the said map is positioned, identification means for the said map being disposed according to a code on one side of the frame.

4. A topography indicator as set forth in claim 1, wherein the selector means for the individual maps comprise: a reader sensitive to the identification means and delivering coded identification signals corresponding to the said identification means; binary counters controlled at the end of the movements of the projected map and delivering coded selection signals depending upon the order occupied in the grid by the map for selection; and comparator means sensitive to the correspondence between the selection signal and the identification signals of the maps contained in the magazine in order to control the transfer means.

5. A position indicator as set forth in claim 1, wherein the transfer means comprise: a slider adapted to be moved substantially into the object plane provided in the optical system for the map, and provided with projections to engage one side of the selected map retained in the said object plane; a rotary disc, a link connecting the disc to the slider to transmit to the latter a reciprocating movement in parallel relationship to the said side of the map; driving means to actuate the disc; control and positioning means driven from the selector means to control the said driving means and to position the disc in two angular positions corresponding respectively to the position occupied by the selected map for its projection on to the screen and the position it occupies when it is situated in its compartment in the magazine.

6. A position indicator as set forth in claim 5, further comprising: driving means to actuate the map magazine; brake clutch means interposed between the said driving means and the said magazine; a delay relay to control the said driving means; a relay to control the brake-clutch means and actuate the selector means; and programming means comprising a cam, a motor positively connected to the said cam and controlled on each operating cycle of the selector means, and contactor means actuated by the said cam to control the said driving and positioning means, the magazine driving means, and the brake-clutch means.

7. A topography indicator as set forth in claim 1, wherein the carrier means for the map to be projected on to the screen and controlled from the navigation computer comprises: a fixed support; a first carriage movable on said fixed support in a direction corresponding to the north-south direction; a second carriage movable on the first carriage orthogonally thereto in a direction corresponding to the east-west direction and arranged to carry the selected map to be projected on to the screen; and two kinematic chains with drive motors and respectively connected to the first and second carriages and controlled from the navigation computer.

8. A topography indicator as set forth in claim 1, wherein the optical system comprises at least one total-reflections prism pivotable about an axis extending transversely of the axis of the optical system in order to lower the said optical axis beneath the centre of the screen.

9. A topography indicator as set forth in claim 1, also comprising a compass rose disposed in an object plane of the optical system and centered with respect to the aircraft symbol to be projected on to the screen.

10. A topography indicator as set forth in claim 1, wherein the aircraft symbol is provided with a vector and is orientable with the vector about the optical axis of the optical system and can be actuated by drive means.

11. A topography indicator as set forth in claim 10, further comprising optical means for rotating the projection beam on itself, said means being disposed on the axis of the optical system downstream of the map at present in use and of the compass rose so that the images of the map and of the compass rose projected onto the said screen can be oriented about the center of the screen.

12. A topography indicator as set forth in claim 11, wherein the said optical rotating means consist of a Wollaston prism.

13. A topography indicator as set forth in claim 9, wherein the object plane of the map for projection, the object plane of the compass rose and the object plane of the aircraft symbol are separate from one another and belong to separate individual optical systems disposed one after the other and whose individual optical axes are situated on the axis of the complete optical system so that the images of the map, compass rose and aircraft symbol are superimposed on one another on the projection screen.

14. A topography indicator as set forth in claim 1, wherein in addition to the individual maps of the area over which the aircraft is to fly the magazine also contains at least one master map selected automatically by the selector means when the aircraft is flying above an area for which there is no corresponding individual map.

15. A topography indicator as set forth in claim 1, further comprising: special maps in the map magazine in addition to the individual maps of the area over which the aircraft is to fly; manual selection and control means connected to the transfer means to select the said special maps, selectively bring one of them into the projection position and return it to the magazine.

16. A topography indicator as set forth in claim 1, further comprising: automatic control means sensitive to the components of a vector connecting the aircraft to a radio beacon shown on a map and adapted to act on the carrier means containing the said map to bring the image of the beacon shown on the map into register with the axis of the optical projection system; and manual control means for moving the map in use, so that if the image of the radio beacon and the image of the aircraft symbol do not register with one another, with resulting navigation error, the user can establish such register manually to correct the error.

17. In an aircraft topography indicator controllable by a navigation computer yielding flight data of the speed, direction and drift type for continuous indication of the position of an aircraft by the projection onto a screen of a map of the area over which the said aircraft is flying, the aircraft being represented by a symbol projected on to the same screen over which the image of the map passes, the said map being movable, associated with identification means, and having its movements controlled by the said navigation computer, comprising: projection means consisting of at least one light source, an optical system and a projection screen, the symbol denoting the aircraft being disposed in an object plane of the optical system so as to be projected on to the said screen; a magazine to contain detachable individual maps of the area over which the aircraft is to fly, the maps together forming a grid selection means whereby a map corresponding to the area over which the aircraft is next to fly is selected from the individual maps in said magazine in dependence on the position of the map still being projected onto the screen and the position occupied by the next map in the grid; and transfer means controlled by the said selection means for individually bringing each of the individual selected maps into an object plane of the optical system for projection on to the said screen and for return to the said magazine; carrier means whose orthogonal movements are controlled from the navigation computer to move the map in its object plane during its projection, formed by a first carriage movable in a direction corresponding to the north-south direction; a second carriage movable orthogonally to the first in a direction corresponding to the east-west direction and bearing the selected map for projection on the screen; drive means for the first and second carriages controlled from the navigation computer; and anamorphosis means connected positively to the said carriages for control of the angular position of the second carriage with respect to the first in dependence on the relative position in the east-west direction of the second carriage with respect to the first and in dependence upon the mean latitude of the map being used.

18. A topography indicator according to claim 17, wherein the anamorphosis means comprise: two symmetrical slides articulated in two spaced points disposed symmetrically with respect to a central axis of the map borne by the second carriage; two guides for the said slides, each articulated on the first carriage at points situated substantially at the middle of their length and adapted together to form a very open and variagle obtuse angle; a central slide guided on the first carriage in parallel relationship to the movement of translation of said carriage and oriented substantially to the bisector of said angle; a cam whose axis perpendicular to the plane of the map is borne by the first carriage; and drive means to drive the cam and controlled in dependence on the mean latitude of the map situated in the second carriage.

References Cited

UNITED STATES PATENTS 3,209,645   10/1965   Guttmann _____ 88—24

NORTON ANSHER, *Primary Examiner.*

W. M. FRYE, *Assistant Examiner.*

UNITED STATES PATENT OFFICE

CERTIFICATE OF CORRECTION

Patent No. 3,344,707            October 3, 1967

Jean Jullien-Davin

It is hereby certified that error appears in the above numbered patent requiring correction and that the said Letters Patent should read as corrected below.

In the heading to the printed specification, line 6, for "Dec. 7, 1965," read -- Mar. 10, 1965, --.

Signed and sealed this 4th day of March 1969.

(SEAL)
Attest:

Edward M. Fletcher, Jr.

Attesting Officer

EDWARD J. BRENNER

Commissioner of Patents